US011799832B2

(12) United States Patent
Moore et al.

(10) Patent No.: US 11,799,832 B2
(45) Date of Patent: *Oct. 24, 2023

(54) CYBER PROTECTIONS OF REMOTE NETWORKS VIA SELECTIVE POLICY ENFORCEMENT AT A CENTRAL NETWORK

(71) Applicant: Centripetal Networks, LLC, Portsmouth, NH (US)

(72) Inventors: Sean Moore, Hollis, NH (US); Peter P. Geremia, Portsmouth, NH (US)

(73) Assignee: Centripetal Networks, LLC, Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,446

(22) Filed: Feb. 13, 2023

(65) Prior Publication Data

US 2023/0198948 A1   Jun. 22, 2023

Related U.S. Application Data

(63) Continuation of application No. 17/669,093, filed on Feb. 10, 2022, now Pat. No. 11,582,191, which is a
(Continued)

(51) Int. Cl.
*H04L 9/40* (2022.01)
*H04L 12/46* (2006.01)
*H04L 12/66* (2006.01)

(52) U.S. Cl.
CPC ...... *H04L 63/0245* (2013.01); *H04L 12/4633* (2013.01); *H04L 12/66* (2013.01); *H04L 63/0263* (2013.01)

(58) Field of Classification Search
CPC . H04L 63/0245; H04L 12/4633; H04L 12/66; H04L 63/0263
See application file for complete search history.

(56) References Cited

U.S. PATENT DOCUMENTS 6,880,005 B1   4/2005   Bell et al.
7,444,515 B2  10/2008   Dharmapurikar et al.
(Continued)

FOREIGN PATENT DOCUMENTS

JP   2009182516 A   8/2009
JP   2017138784 A   8/2017
(Continued)

OTHER PUBLICATIONS

Sep. 29, 2020—(WO) International Search Report and Written Opinion—PCT/US2020/037688.
(Continued)

*Primary Examiner* — Darren B Schwartz
(74) *Attorney, Agent, or Firm* — Banner & Witcoff, Ltd.

(57) ABSTRACT

An enterprise organization may operate a central network and one or more remote networks, each comprising a plurality of computing devices. For protection against malicious actors, the central network may be configured to filter network traffic associated with the computing devices based on identified threats. Traffic corresponding to computing devices connected to the remote network may be tunneled to the central network for filtering by the central network. A tunnel gateway device, associated with the remote network, may efficiently identify which communications are associated with Internet threats, and tunnel such identified traffic to the central network, where actions may be taken to protect the enterprise network.

27 Claims, 9 Drawing Sheets

Related U.S. Application Data continuation-in-part of application No. 17/371,487, filed on Jul. 9, 2021, now Pat. No. 11,374,905, which is a continuation of application No. 17/194,886, filed on Mar. 8, 2021, now Pat. No. 11,063,909, which is a continuation of application No. 16/897,942, filed on Jun. 10, 2020, now Pat. No. 10,944,721, which is a continuation of application No. 16/502,565, filed on Jul. 3, 2019, now Pat. No. 10,715,493.

(56) References Cited

U.S. PATENT DOCUMENTS

| | | |
|---|---|---|
| 7,823,195 B1 | 10/2010 | Xie et al. |
| 8,510,821 B1 | 8/2013 | Brandwine et al. |
| 8,578,497 B2 | 11/2013 | Antonakakis et al. |
| 8,630,294 B1 | 1/2014 | Keen et al. |
| 8,914,845 B2 | 12/2014 | Barton et al. |
| 8,949,371 B1 | 2/2015 | Shrowty |
| 9,118,702 B2 | 8/2015 | MaCaulay |
| 9,171,153 B2 | 10/2015 | Jorgensen |
| 9,436,596 B2 | 9/2016 | Sengupta et al. |
| 9,622,176 B2 | 4/2017 | Sathy et al. |
| 10,051,001 B1 | 8/2018 | Ashley et al. |
| 10,659,571 B1 | 5/2020 | Volpe |
| 2007/0115986 A1 | 5/2007 | Shankara |
| 2007/0240222 A1 | 10/2007 | Tuvell et al. |
| 2008/0163333 A1 | 7/2008 | Kasralikar |
| 2008/0232359 A1 | 9/2008 | Kim et al. |
| 2013/0265875 A1 | 10/2013 | Dyke et al. |
| 2014/0089498 A1* | 3/2014 | Goldfarb ............ H04L 63/0263 709/224 |
| 2014/0157405 A1 | 6/2014 | Joll et al. |
| 2014/0244779 A1 | 8/2014 | Roitshtein et al. |
| 2014/0380459 A1 | 12/2014 | Lee et al. |
| 2015/0296505 A1 | 10/2015 | Luna et al. |
| 2016/0182380 A1 | 6/2016 | Mehra et al. |
| 2016/0248797 A1 | 8/2016 | Yampolskiy et al. |
| 2016/0255050 A1* | 9/2016 | Grayson ............ H04L 63/1433 726/1 |
| 2017/0126740 A1 | 5/2017 | Bejarano Ardila et al. |
| 2017/0251003 A1 | 8/2017 | Rostami-Hesarsorkh et al. |
| 2017/0302703 A1 | 10/2017 | Buruganahalli et al. |
| 2017/0324709 A1 | 11/2017 | Ahn et al. |
| 2018/0063084 A1* | 3/2018 | Waku .................. H04L 45/42 |
| 2018/0255084 A1* | 9/2018 | Kotinas ............... H04L 63/1425 |
| 2018/0309658 A1 | 10/2018 | Parla et al. |
| 2020/0162382 A1 | 5/2020 | Mendoza et al. |

FOREIGN PATENT DOCUMENTS

| | | |
|---|---|---|
| WO | 2016171690 A1 | 10/2016 |
| WO | 2021003014 A1 | 1/2021 |

OTHER PUBLICATIONS

Zhang, Menghao, et al., "Tripod: Towards a Scalable, Efficient and Resilient Cloud Gateway," IEEE Journal on Selected Areas in Communications, IEEE Service Center, vol. 37, No. 3, Mar. 1, 2019, pp. 570-585.

Feb. 17, 2023 (JP) Notification of Reason(s) for Refusal, App 2022-500516, with English translation, 10 pages.

Apr. 20, 2023—(WO) International Search Report and Written Opinion—PCT/US2022/054059.

* cited by examiner

CYBER PROTECTIONS OF REMOTE NETWORKS VIA SELECTIVE POLICY ENFORCEMENT AT A CENTRAL NETWORK

CROSS-REFERENCE FOR RELATED APPLICATIONS

This application is a continuation of U.S. patent application Ser. No. 17/669,093, filed Feb. 10, 2022, which is a continuation-in-part of U.S. patent application Ser. No. 17/371,487, filed Jul. 9, 2021, which is a continuation of U.S. patent application Ser. No. 17/194,886, filed Mar. 8, 2021, now U.S. Pat. No. 11,063,909, which is a continuation of U.S. patent application Ser. No. 16/897,942, filed Jun. 10, 2020, now U.S. Pat. No. 10,944,721, which is a continuation of U.S. patent application Ser. No. 16/502,565, filed Jul. 3, 2019, now U.S. Pat. No. 10,715,493, the contents of each of which is hereby incorporated by reference into the present application in its entirety.

FIELD OF USE

Aspects described herein generally relate to computer hardware, software, and network security. In particular, one or more aspects of the disclosure generally relate to computer hardware and software for efficient cyber protections of remote networks.

BACKGROUND

Network security is becoming increasingly important as the information age continues to unfold. Network threats/attacks may take a variety of forms (e.g., unauthorized requests or data transfers, viruses, malware, large volumes of traffic designed to overwhelm resources, and the like). Many of these threats use the Internet to access and attack enterprise computer resources/assets, as follows: Immobile, or fixed, enterprise hosts such as desktop computers, on-premises or cloud enterprise applications servers, public-facing web servers, and the like, may be directly attached to private TCP/IP networks that are owned and/or operated and administrated by enterprises. These enterprise networks are in turn directly connected to the Internet so that (a) an individual enterprise's geographically distributed private networks and associated assets can access each other by using the Internet to interconnect them; (b) an individual enterprise's hosts can access other publicly addressed Internet-attached hosts (e.g., public web servers and application servers); and (c) other Internet-attached hosts can access the enterprise's public-facing hosts (e.g., e-commerce web servers). However, Internet-attached hosts may include hosts that are owned, operated, or otherwise controlled by malicious actors. These malicious actors use the Internet not only to access and attack an enterprise's public-facing hosts, but also to attack an enterprise's private resources when they are able to, for example, when they have managed to subvert the network perimeter defense structures that the enterprise uses to protect its private assets.

A conventional approach for an enterprise to protect its fixed/immobile networked assets from Internet threats is to secure its private networks at the Internet access points, also known as the enterprise network perimeter, or boundary. The enterprise defines a security policy that specifies which network traffic may be allowed to cross the boundary, in either direction (e.g. originating from hosts directly attached to, or inside, the enterprise network and destined towards Internet hosts; or conversely, originating from Internet hosts and destined towards hosts attached to the enterprise network). The security policy is enforced by various devices located at or near the Internet access points, such as network firewalls, web proxies, SSL/TLS proxies, intrusion prevention systems (IPS), intrusion detection systems (IDS) (which may be provided out-of-band), threat intelligence gateways (TIGs), and the like. This collection of devices may be called a security stack or enterprise network security stack. The effectiveness of the protections provided by the security stack may be determined by the quality, scope, and fidelity of the network security policy combined with the capabilities of the devices to efficiently enforce the policy without degrading network performance to unacceptable levels.

The conventional enterprise security stack, however, may be unable to protect an enterprise's mobile hosts/devices, such as enterprise users' personal mobile smartphones, portable tablets, and portable desktops, from Internet threats. This is because such devices may directly connect to the Internet via radio access networks such as cellular networks and Wi-Fi networks. In such scenarios, these mobile devices may communicate directly with Internet hosts but without filtering the associated network traffic through the enterprise security stack. Thus, malicious Internet hosts and actors can readily attack the mobile devices and can readily infect the mobile devices with malware or otherwise may gain control of resources and applications on the mobile devices. Furthermore, the mobile devices may serve as vehicles-of-entry for malicious actors to penetrate the enterprise network and attack the enterprise's fixed networked assets. For example, the enterprise mobile devices and/or applications that the devices host may have privileged and authorized access to enterprise application servers that are located behind the security stack. As another example, mobile users may sometimes attach their mobile devices directly to the enterprise network via a Wi-Fi access point. In both of these examples, the malicious actors may gain direct and unfettered access to enterprise network assets. The malicious actors may then leverage the mobile device's access to assets behind the security stack to attack the enterprise assets.

A conventional approach to securing an enterprise's mobile assets is to (a) configure (secure) tunnels between each enterprise mobile device and a tunnel gateway located behind the enterprise security stack; and (b) send most or all of the mobile devices' Internet communications through the tunnel. When the communications exit the tunnel gateway, the communications may be sent through the enterprise security stack. An enterprise security policy may be applied to the communications, while on their way to Internet hosts. Any responsive communications sourced by the Internet hosts may be similarly filtered through the security stack. There are multiple practical issues with this approach, however, that may cause enterprises not to use it and/or may cause mobile device users to reject it, which may result in an enterprise not effectively securing mobile devices, and therefore the enterprise networked assets, from Internet threats.

One of the most challenging issues is the inefficiency of tunneling substantially all of the mobile devices' Internet traffic back to the tunnel gateways so that the traffic can be filtered through the security stack to detect communications that may be associated with Internet threats. Typically only a very small percentage of Internet communications originating from an enterprise's mobile devices are communicating with Internet threats, and thus only this threat-associated traffic needs to be filtered. Also, as the enterprise workforce becomes increasingly mobile, and because enterprise users overwhelmingly prefer to use their own personal mobile devices (e.g., smartphones) for both personal and work/enterprise communications—a market phenomenon called "Bring your own device" or "BYOD"—much of a mobile device's Internet traffic may be personal communications (e.g. high-bandwidth videos) that (a) are not threats to the enterprise, and (b) are private communications that the user might not want to subject unnecessarily to the enterprise's security policies and corporate usage policies. Also, local privacy protection laws or regulations may factor in to whether or not the enterprise is allowed to filter these personal communications. Thus, enterprise network resources used to secure mobile device traffic may be wasted. Also, the mobile devices may waste many resources, including battery power, by unnecessarily encrypting and tunneling traffic that is legitimate and/or benign. As the next generation of cellular networks are deployed, which provide for even higher bandwidths, even more bandwidth consumption by applications, and even more resource consumption by mobile devices, it is expected that the costs and other inefficiencies of conventionally securing mobile devices' Internet traffic and associated enterprise networks will increase and may become prohibitive.

Relatedly to the issue above, an individual enterprise's network may often be a collection of multiple geographically distributed private networks interconnected by the Internet. The enterprise may organize its collection of networks by designating one or more of the (larger) private networks as, for example, the "central network(s)", "core network(s)", "data center network(s)", etc., and the one or more of the remaining (smaller) private networks as, for example, the "remote network(s)", "affiliate network(s)", etc. The network architecture of an enterprise network that is organized as a collection of central networks and associated remote networks may be referred to as a "hub-and-spoke" architecture.

A conventional approach to providing network cybersecurity across the collection of central and remote networks associated with an enterprise may be deployment of security stack(s). Security stacks may be deployed at each of the central and remote networks. An enterprise security policy may be applied by the security stack(s) to communications between enterprise hosts and Internet hosts. However, it may be cost inefficient to deploy security stacks in the remote network(s). For example, an organization might have hundreds of remote offices, such that deployment of robust security stacks at each and every remote office might be prohibitively expensive. Instead, the security stack(s) may be deployed in the central network(s), and any Internet traffic associated with the remote network(s) may be (securely) tunneled, or backhauled, to the central network(s). At the central network(s), the remote network(s)'s Internet traffic may be secured by the central network's security stack. In this manner, the remote offices might enjoy the benefits of the robust security stack located at the central network(s), but such robust security stacks need not be deployed at each and every remote office.

Remote network(s) may have one or more host computers connected to it. Tunnel(s) (such as secure tunnels) may be configured between each of the remote network(s) and a central network tunnel gateway located inside the associated central network. The central network tunnel gateway may be behind the associated central network's enterprise security stack. Such tunnel(s) may be implemented using, for example, an IPsec virtual private network (VPN) tunneling technology or any of a multitude of (secure) tunneling technologies. Most or all of the remote network's Internet communications may be sent through the tunnel via the central network tunnel gateway/terminal. Internet communications that exit the central network tunnel gateway inside the associated central network may be sent through the enterprise security stack. An enterprise security policy may be applied to the communications by the security stack. For example, the enterprise security stack may apply the enterprise security policy to Internet communications, received from the remote network, while on their way to Internet hosts. Any responsive communications sourced by the Internet hosts may be similarly filtered through the enterprise security stack, sent into the central network tunnel gateway, and tunneled back to the remote network.

As described above with reference to detecting Internet threats in mobile device communications by tunneling substantially all of a mobile device's traffic for filtering through a security stack, tunneling substantially all of a remote network's traffic through a security stack at a central network may be inefficient. Typically, only a very small percentage of Internet communications originating from an enterprise's remote network(s) may be communicating with Internet threats, and thus only this threat-associated traffic needs to be filtered. As such, relatively large amounts of computing resources and network bandwidth capacity may be wasted by unnecessarily tunneling and processing benign remote network packet traffic.

Another approach to providing network cybersecurity across a collection of networks and devices associated with an enterprise may be using a secure access service edge (SASE) framework. A SASE framework incorporates a software-defined wide area network (SD-WAN) that connects the enterprise's distributed networks and devices (e.g., computing devices, mobile devices). For example, SD-WAN gateways may be used to transmit/receive data across different private networks (e.g., via a public network, such as Internet) and devices, with an SD-WAN controller being used to manage routing between the networks. A SASE framework additionally enables various enterprise applications to be available for use in the cloud. Availability of applications in the cloud may improve ease of access across networks and personal devices. This also allows a cloud-based network cybersecurity system to seamlessly apply the enterprise security policy to communications to/from the distributed networks/devices without backhauling traffic to a central network's security stack.

However, incorporating a SASE framework may require substantial redesign of the enterprise's network architecture and retiring of already implemented security solutions. As such, this approach may be cost-inefficient. Further, most vendors of SASE architectures offer an integrated solution comprising various enterprise applications and cybersecurity solutions. This may reduce flexibility as an enterprise may prefer to pick and choose its vendors for specific applications. A SASE framework also results in a single point of failure. Failure to connect to the cloud may result in users being locked out of all services provided by the SASE vendor.

Accordingly, there is a need to efficiently secure an enterprise's remote networks with the enterprise's network security policy and thereby protect the enterprise's networked assets from Internet threats.

SUMMARY

The following presents a simplified summary in order to provide a basic understanding of some aspects of the disclosure. It is intended neither to identify key or critical elements of the disclosure nor to delineate the scope of the disclosure. The following summary merely presents some concepts of the disclosure in a simplified form as a prelude to the description below.

Aspects of this disclosure relate to efficiently securing mobile devices and/or enterprise networks from Internet threats. The mobile devices and/or enterprise networks may identify communications traffic (e.g., Internet traffic, mobile device traffic) that may be associated with Internet threats, and may tunnel only such identified traffic to tunnel gateways for filtering by an enterprise security stack. For example, an enterprise network may comprise one or more remote networks and associated central networks. The remote networks may identify Internet communications traffic that may be associated with Internet threats. Once the remote networks have identified traffic potentially associated with Internet threats, the remote networks might tunnel only such identified traffic to associated central networks' tunnel gateways for filtering by the central networks' enterprise security stack. In this manner, the central networks' enterprise stack may be provided only traffic which is likely worth filtering; that is, the central networks' enterprise stack is unlikely to receive traffic that should be allowed without filtering and/or other further processing. In this manner, computing resources and network bandwidth capacity are conserved, thereby potentially reducing capital and operating expenses (CAPEX and OPEX), while maintaining the security of the overall enterprise network. Further, this enables the substantial use of existing security architecture of the enterprise without requiring a complete redesign as may be required if migrating to a SASE framework.

The identification of communications that are associated with Internet threats may leverage databases or data structures of cyber threat intelligence (CTI) that are available from many CTI provider (CTIP) organizations. This CTI may include indicators, or threat indicators, or Indicators-of-Compromise (IoCs). The CTI may include Internet network addresses—in the form of IP addresses, IP address ranges, L4 ports and associated L3 protocol types, domain names, URIs, and the like—of resources that may be controlled/operated by threat actors, or that may have otherwise been associated with malicious activity. The CTI indicators/threat indicators may also include identifiers for certificates and associated certificate authorities that are used to secure some TCP/IP communications (e.g., X.509 certificates used by the TLS protocol to secure HTTP-mediated sessions).

To determine if an active communication may be associated with an Internet threat, the in-transit packets composing the communication may be compared to the database of or data structure containing threat indicators by, for example, a packet filtering device that applies packet filtering rules generated from the database of threat indicators. If a match is determined between a value for a packet and a threat indicator in the database or data structure, then at least one of a set of protective actions, or packet transformation functions (PTFs), may be applied to the packet. Those protective actions/PTFs may include dropping a packet, allowing a packet to continue to its intended destination, monitor a packet (which may include logging and capturing the packet or logging and forwarding the packet), mirroring a packet to its intended destination and to another network device for monitoring or testing, redirecting a packet, generating a corresponding response packet, or the like.

The protective actions/PTFs may be determined in part by the threat intelligence data or threat metadata provided by the associated CTIP that supplied the indicator. The CTIPs may associate their CTI indicators with a threat risk value that is non-binary. For example, an indicator's risk may be represented as or associated with a probability or likelihood that an associated packet or communication comprises a threat or attack. Such threat risk values may be factored in to the determination of the protective action/PTF that may be applied to the matching packet. For example, if there is nearly 100% threat risk associated with a packet, the packet may be dropped because it is very likely to comprise a threat or attack. The packet may also be logged, captured, and alerted to authorities, who should be made aware of the threat/attack. Conversely, if there is nearly 0% threat risk associated with a packet, the packet may be allowed to proceed towards its destination because it is unlikely to be part of an attack. As another example, if a packet's risk likelihood is 50%, then the packet may be allowed to continue to its intended destination, but the packet may also be logged, captured, or the risk may be identified in an alert to designated authorities, who may further analyze the packet and associated communication to determine whether or not the packet/communication was part of an attack. Estimating risk values and selecting associated actions/PTFs, or network protective actions, may be a function of several variables, including threat metadata (e.g., attack type, attack attribution, and the like) which may be provided by the associated CTIP, the number of CTIPs that supplied the same indicator, which CTIP(s) supplied the indicator, the fidelity of the indicator, the geographical location of the originator of the packet, the preferences of the administrators of the associated network being protected, and the like.

A policy creation and management system (a) may receive CTI and associated metadata from one or more CTIPs; (b) may aggregate the threat indicators (e.g., merge and remove duplicate information); (c) may create a packet filtering rule for each threat indicator; (d) may collect all of the packet filtering rules into a policy; and (e) may distribute the policy to subscribing policy enforcement devices such as network firewalls and threat intelligence gateways (TIGs). In step (c) when creating packet filtering rules, each rule may specify (1) packet matching criteria, e.g., pairs of packet fields and values, where the values are CTI indicators; and (2) a packet disposition, or network protective action, or PTF, or rule action, to be applied to a packet that matches the rule's criteria. The packet filtering rule's syntax may be specified by the policy enforcement device. The syntax may be the same as or similar to syntaxes for commercial firewalls such as BSD PF or iptables. The packet dispositions/actions/PTFs may be specified by policy creation logic that, as described above, may factor in CTIP-supplied threat metadata, administrator preferences, and the like. The policy enforcement devices may be configured to enforce the CTI-derived policies for communications associated with mobile devices associated with enterprise users, remote networks associated with the enterprise, and/or any other devices/networks associated with the enterprise (e.g., devices/networks that may communicate with networks and assets operated and/or administered by the enterprise).

The size of CTI-derived policies may factor into the disclosed methods and systems. To provide the most effective network protections, the CTI from many different independent CTIPs should be used to derive the policies. As CTIPs may differentiate themselves by, for example, attack types, market segments, threat metadata quality, indicator types, and fidelity, there may be very little overlap between the indicators supplied by independent CTIPs. For two sets of threat indicators supplied by any two independent CTIPs, the intersection of the sets may be relatively small or even null. Thus, to have the best chance of observing an active threat communication, CTI available from as many independent CTIPs as practical should be used to derive policies. This may result in very large policies. For example, a size of a CTI-derived policy created from many independent CTIPs may be five (5) million packet-filtering rules. However, the scope of Internet threats continues to grow quickly, and accordingly CTIPs continue to produce more CTI. Thus, for future proofing, filtering systems may be designed to handle an order-of-magnitude increase in the size of effective CTI-derived policies, to include in the range of 10-50 million packet filtering rules.

The dynamics of CTI-derived policies may also factor into the described methods and systems. CTI continually changes because, for example, malicious actors are continually and rapidly creating new attacks with new threat indicators. Threat indicators may also "age out" after 60-180 days and are no longer considered risky. Also, CTIPs may differentiate by the frequency of their CTI updates. Accordingly, CTI-derived policies must be updated frequently in order to maintain effectiveness. In practice, CTI-derived policy distribution frequencies may be weekly, daily, or hourly.

The characterization of each rule in a policy by an indicator in the rule's matching criteria may also factor into the disclosed methods and systems. This property may be exploited by tests to determine if packet data will match any rule in the policy before searching the policy.

Due to the size and dynamics of CTI databases, the use of CTI to protect networks may benefit from automation for both policy creation and policy enforcement. For policy enforcement automation, any network device that may apply packet filtering rules to in-transit network traffic, such as a network firewall, may potentially perform the policy enforcement function. To apply CTI to protect networks, it is beneficial for a policy enforcement device to be capable of: (a) applying very large policies composed of millions of packet filtering rules to in-transit network traffic on high-speed Internet access links (e.g. 10G) without significant latency or packet loss (e.g. due to buffer overflows caused by large latency); (b) applying packet filtering rules with different types of indicators in their matching criteria, for example, IP addresses, IP address ranges, 5-tuples, domain names, URIs, X.509 certificates, and the like; (c) quickly and frequently updating the currently enforced very large policy with a new very large policy without loss of packet forwarding service or loss of security/protections; and (d) logging and capturing packets so that, for example, the communications may be cyber analyzed using, for example, security information and event management (SIEM) applications and packet analyzer applications.

One potential approach to protecting mobile devices and associated networks with CTI-derived policies is to locate the policy enforcement function on the endpoint mobile device. Mobile device operating systems such as Android include a network firewall capability (e.g. iptables in Android) that can apply CTI-derived packet filtering rules to traffic originated by and received by the endpoint mobile device. But while iptables, as well as conventional network firewalls and so-called "next-gen" firewalls, may be identified with the CTI-derived policy enforcement function when they are configured with CTI-derived rules, such firewalls typically do not have all of the above capabilities of a network gateway. In addition, conventional mobile devices generally lack sufficient processor and memory requirements to support the capabilities of a network gateway. Also, mobile devices typically minimize processing load and therefore power consumption in order to conserve the power stored in their batteries. Thus, this potential approach of locating an effective policy enforcement function on the mobile device may be impractical.

To address the issues with the limited processing capability and battery power conservation of mobile devices, the policy enforcement function (e.g. a TIG) with the security stack may be provided at the enterprise network's Internet access points; and, instead of tunneling all of the Internet traffic from each mobile device to a tunnel gateway located behind the security stack, the system might tunnel from each mobile device only the Internet traffic that may match a packet filtering rule in the CTI-derived policy enforced by the TIG. The system may locally execute logic, on each mobile device, that efficiently determines which Internet traffic packets will match a packet filtering rule in the policy enforced by the (remote) TIG located in the enterprise network.

One potential approach to protecting remote networks and their associated central networks with CTI-derived policies is to locate both the (CTI-derived) policy enforcement function (e.g., a TIG) and the enterprise security stack not only in the central network(s), but also in the remote networks. However, as noted above, it may be considered prohibitively expensive to locate a policy enforcement function and an enterprise security stack at the remote networks. This is particularly the case for larger organizations which might have many smaller remote offices, where the cost of implementing and operating the security functions might be prohibitively expensive.

A policy enforcement function (e.g., TIG) along with a security stack may be provided at the central network's Internet access point (e.g., such that all Internet traffic at the central network must pass through the policy enforcement function and the security stack). To address cost inefficiencies associated with provisioning a policy enforcement function and a security stack at each remote network, the policy enforcement function and the security stack at the central network may be used for providing protections for the remote networks. Instead of tunneling all of the Internet traffic from each remote network to a central network tunnel gateway located behind the central network's security stack and policy enforcement function, each remote network might tunnel only the Internet traffic that may match a packet filtering rule in the CTI-derived policy enforced by the policy enforcement function of the central network. All other Internet traffic may bypass the tunnel and communicate directly with the Internet. For example, a remote network tunnel gateway device/function, located at or near the remote network's boundary with the Internet, may terminate one end of the tunnel connected to the central network tunnel gateway and may locally execute logic that efficiently determines which Internet traffic packets will match a packet filtering rule in the policy enforced by the (remote) policy enforcement function located in the associated central network. The remote network tunnel gateway may send matching traffic into the tunnel to the central network (e.g., where traffic exits the tunnel via the central network tunnel gateway). The remote network tunnel gateway may be a network appliance or any other type of computing device (e.g., desktop computer, laptop computer, mobile computing device, etc.) associated with the remote network.

While various examples herein describe use of a data structure at a mobile device or a remote network tunnel gateway to determine which Internet traffic is to be tunneled to a central network (e.g., for policy enforcement at a policy enforcement function and additional processing at a security stack), methods, devices, and systems as described herein may be applied to any device or network that is capable of tunneling traffic to another network with policy enforcement capabilities and/or a security stack.

To efficiently determine which Internet traffic packets will match a packet filtering rule in the policy, each rule in a CTI-derived policy may be characterized by a threat indicator. The threat indicator may be used as a filtering rule's matching criteria. A mobile device and/or a remote network tunnel gateway may utilize a data structure that represents each rule in a security policy by its characterizing threat indicator to determine if an Internet traffic packet will match a rule in the policy. To represent an entire policy, the system may collect all of the indicators—IP addresses, domain names, URIs, certificate IDs, etc.—that characterize each rule in the policy and insert each such indicator into, for example, a data structure (e.g., a probabilistic data structure). The data structure may be tested to determine if an element (e.g. an IP address, domain name, URI, certificate ID, etc.) is a member of the data structure (e.g., if the element is a member of/in the set of indicators used to generate the data structure). The data structure may be generated by a policy management server, may be distributed to each mobile device and/or remote network tunnel gateway, and may be stored on each mobile device and/or remote network that may be protected by the policy. When the mobile device and/or the remote network originates or receives an Internet traffic packet, computer logic and/or an application on the mobile device and/or the remote network tunnel gateway may extract any elements contained in the packet that may correspond to threat indicators in the data structure, such as an IP address, domain name, URI, certificate ID, etc., and may test the data structure to determine if any such element is a member of the set of the data structure. If the test indicates that any packet element is a member of the set of threat indicators, then the packet, or a copy of the packet, may be tunneled to the tunnel gateway (e.g., a central network tunnel gateway), which may be located in the enterprise private network (e.g., a central network). Upon exiting the tunnel gateway, the packet may be sent to the TIG, which may filter the packet through the policy to determine which packet filtering rule matches the packet. When the matching rule is determined by a policy test by the TIG, the action(s) or PTF(s) associated with the rule may be applied to the packet to protect the network. If the action(s) or PTF(s) cause the packet to be forwarded towards the Internet, the packet may be passed through an associated security stack.

The data structure is preferably efficient with respect to both space and time. The memory required to store the set of elements, or threat indicators, that characterize the rules in the policy, must be small relative to the available main memory on the mobile device and/or the remote network tunnel gateway, and a membership test function and an element insertion function must be fast and efficient in both theory and in practice. As described in U.S. patent application Ser. No. 16/399,700, filed on Apr. 30, 2019, and which is incorporated herein by reference, a probabilistic data structure called a Bloom filter may satisfy these criteria. A Bloom filter space-efficiently stores the elements of a set, time-efficiently inserts elements into the set, and may be time-efficiently tested to determine if an element may be a member of a set. Bloom filters are parameterized by a false positive rate P, which is the probability that a set membership test for an element returns True when in fact the element is not a member of the set. For Bloom filters, the false negative rate is zero. That is, if a set membership test for an element returns False, then it is certain that the element is not a member of the set.

A Bloom filter may be used by the mobile device and/or the remote network tunnel gateway to efficiently determine if a packet element, such as an IP address, domain name, or URI extracted from an Internet traffic packet, is a member of the set of all indicators that characterize each of the rules in the policy. For example, a Bloom filter of size approximately 9 MBytes may be sufficient to store all of the IP address, domain name, and URL indicators in a real-world policy composed of approximately five (5) million packet filtering rules derived from a similar number (e.g. 5 million) of CTIP-supplied threat indicators, when the false positive rate $P=10^{-3}$, or one in a thousand. A Bloom filter containing 5 million elements may be quickly tested to determine (e.g. typically in less than 1 microsecond) if a given packet element (e.g. IP address, domain name, or URL) is a member. For this or any Bloom filter, space/memory and membership test time requirements vary with the magnitude of the logarithm of P; thus, for example, decreasing $P=10^{-3}$ by a factor of one thousand to $P=10^{-6}$, or one in a million only causes space and time requirements to increase by a factor of 2 (e.g., to approximately 18 MB for this example). Many current mobile smartphones and low-end fixed computing devices may have 1-4 GB of main memory; thus, an exemplary 9 MB Bloom filter may occupy less than 1% of main memory. If the CTI-derived policy increases significantly in size, as measured by the number of packet filtering rules or threat indicators it contains, such that the size of the associated Bloom filter becomes a concern, then the false positive rate may be increased in order to reduce the size of the Bloom filter.

The Bloom filter data structure, which may be abbreviated henceforth as "B/F", will be used in the description of the disclosure, but this choice is exemplary and not meant to be limiting or restrictive in any way. Any data structure with sufficient and similar time and space efficiencies for storing a set of elements, inserting elements into the set, and testing for an elements' membership in a set may be used. At the present time, probabilistic data structure technology continues to evolve, with each new type having different and improved properties and characteristics, e.g., Cuckoo filters, blocked Bloom filters, xor filters, etc. This provides for choosing the best data structure for a given scenario. For example, a Cuckoo filter has similar time and space efficiencies as a Bloom filter (B/F), and also has the capability to efficiently delete, or remove, elements from the set—a capability that a standard Bloom filter does not have, although Bloom filter variants have been developed that support a delete capability. The capability to efficiently delete elements from a set may prove useful in some applications, implementations, and/or embodiments. The data structure may support an Insert( ) function for adding an element to the set, may support a Boolean-valued Member( ) function for testing set membership of an element, and may support a Delete( ) function for removing an element from a set. The data structure may be probabilistic, and may be associated with a non-zero false positive rate P.

If the test indicates that any packet element is a member of the set, the packet is determined to have an association with an Internet threat. As such, a threat associated packet may be tunneled from the mobile device and/or the remote network tunnel gateway to a tunnel gateway (e.g., a central network tunnel gateway, tunnel gateway associated with an enterprise network), which may be located behind the security stack of the associated enterprise network. There are various tunneling technologies and associated methods that may be used, and in some scenarios the tunneling technologies and methods may depend in part on the types of protections and the amount of efficiencies that the enterprise wants for its mobile infrastructure and/or remote networks. Some exemplary tunneling technologies are used in the detailed descriptions below; however, these tunneling technologies are exemplary and not meant to be restrictive or limiting in any way. Other tunneling technologies and methods may be used to realize the invention without departing from the scope of the disclosure.

The exemplary Internet layer/L3 tunneling protocol used in this disclosure description is IPsec tunnel mode (RFC 1431). IPsec tunnel mode may encrypt the packet traffic to be tunneled, may place the encrypted traffic in the payload section of transport layer/L4 packets (either UDP or TCP protocol), and may encapsulate the L4 packets in IP packets in which the IP address fields values are the IP addresses of the tunnel's terminals, which may include the addresses of the mobile device and the enterprise network gateway. Other Internet layer/L3 tunneling protocols may be used, including IP-in-IP (RFC 1203). The mobile devices and/or a remote network tunnel gateway, and the tunneled traffic may be associated with a VPN, so that the associated enterprise network's private addressing scheme may be used to route and/or switch tunneled traffic through the enterprise private network to the TIG, security stack, and Internet. One exemplary way to do this is to use the L2TP protocol combined with IPsec, known as L2TP-over-IPsec, or L2TP/IPsec. L2TP/IPsec is natively supported by both Android and iOS, which are two popular mobile device operating systems. In the description below, the precise details of the protocols may be omitted when referring to tunneling. Those skilled in the art may use the context of the particular scenario to infer the details.

The mobile devices may be situationally associated with an enterprise. That is, the devices may be said to be operating in "enterprise mode" or in "personal mode", or both, depending on the properties of the current communications. For example, when a mobile device is tunneling Internet threat traffic to the enterprise network, then the device may be considered to be an enterprise host/endpoint asset attached to the enterprise network, and therefore operating in enterprise mode. When the mobile device is not tunneling Internet traffic but instead communicating directly with other Internet hosts/endpoints, then it is not considered to be an enterprise host/endpoint asset, and therefore operating in personal mode. The mobile device may simultaneously be operating in both modes. For example, the device may be simultaneously communicating directly with a non-threat/benign Internet host and communicating indirectly with an Internet-threat host via a tunnel. The device may be communicating directly with an Internet-threat host but tunneling a copy of the communication's packets back to the enterprise. Packets tunneled to the enterprise network or copied packets tunneled to the enterprise network may be monitored to determine or analyze network threats. Such packets may be monitored and cyber-analyzed to determine if the communication is an attack or a legitimate/benign communication.

The process may include configuring at least one mobile device and/or remote network tunnel gateway with logic or an application to perform a test of the policy. The logic or application may be installed from an enterprise management server. The mobile device may include a cellular phone, a tablet, laptop computer, or a mobile networking device, such as a mobile hotspot. The enterprise network may be configured with a TIG and a tunnel gateway.

The process may include configuring the remote network tunnel gateway with logic or an application to perform a test of the policy. The logic or application may be installed from an enterprise management server. The associated central network may be configured with a TIG and a central network tunnel gateway.

A policy creation and distribution management server (e.g., associated with a policy creation and management system) may receive CTI from multiple CTIPs and may create a CTI-derived policy based on the received CTI. The CTI-derived policy may include a plurality of rules. The management server may create a data structure (e.g., Bloom filter B/F) based on a set of elements that represents each of the plurality of rules. Such a data structure, hereinafter called TUNNEL-B/F, may contain the threat indicators extracted from each rule in the policy. The system may download the policy to the TIG, and may transmit the data structure TUNNEL-B/F to each mobile device associated with the enterprise network and/or to each remote network tunnel gateway associated with a corresponding remote network, and to other network elements, including the TIG. Alternatively, the TIG may create the data structure TUNNEL-B/F after receiving the CTI-derived policy from the policy creation and distribution management server and then may transmit the data structure TUNNEL-B/F to each mobile device and/or remote network tunnel gateway.

A mobile device may initiate communication with an Internet host. The outbound packet's values, such as IP addresses, domain names, and URIs, may be tested for membership in the data structure TUNNEL-B/F. If a membership test returns True, the system may tunnel the packet to the enterprise network. The packets may be filtered through the TIG and security stack. Each of the subsequent packets in the communication flow may be tunneled to the enterprise network, and may be filtered through the TIG and security stack. If a membership test returns False, the system may forward the packet directly towards the Internet host, without tunneling the packet to the enterprise network.

Upon receipt of a tunneled packet exiting from the tunnel gateway, the enterprise network may forward packets towards the TIG. The TIG may apply the policy to each packet. When the TIG finds the matching packet filtering rule, the TIG may apply the rule's corresponding action(s)/PTF(s) to the packet. An action/PTF may, for example, drop the packet or may forward the packet to the security stack for additional security processing. An action/PTF may cause a packet to be logged and captured so that the packet and associated communication can be analyzed with a SIEM application and/or a packet analyzer application to determine if the communication is a threat or attack, or if the communication is determined to be benign.

A policy creation and distribution management server may receive CTI from multiple CTIPs and may create different CTI-derived policies for different remote networks and/or mobile devices. For example, a remote network of the enterprise organization that stores/accesses confidential data may have a higher security requirement than remote networks that cannot access the confidential data. As a result, the CTI-derived policy associated with the remote network that stores/accesses confidential data may have more stringent packet matching rules (e.g., broader packet matching criteria, stricter PTFs, etc.). Based on the different CTI-derived policies, the policy creation and distribution management server (or the TIG) may generate different data structures (e.g., Bloom filters) for the different remote networks.

As one example of the above concept, an enterprise organization may have a finance department and a marketing department, and both might be located in remote offices. The finance department might have a higher security requirement than the marketing department, in part because the former might have access to sensitive banking information, whereas the latter might need the ability to freely access online content relating to potential clients. In such a circumstance, a CTI-derived policy (e.g., as embodied in a Bloom filter) for the finance department might have more rules and/or be otherwise stricter as compared to a CTI-derived policy for the marketing department.

Configuration of different CTI-derived policies may also be applied for mobile device communications. For example, a first mobile device that is enabled to access confidential data may have a higher security requirement than a second mobile device that cannot access the confidential data. As a result, the CTI-derived policy associated with the first mobile device may have more stringent packet matching rules (e.g., broader packet matching criteria, stricter PTFs, etc.). Based on the different CTI-derived policies, the policy creation and distribution management server (or the TIG) may generate different data structures (e.g., Bloom filters) for the different mobile devices.

One or more hosts connected to a remote network (for example, one or more personal computers (PCs)) may initiate communications with one or more Internet hosts connected to Internet (for example, a web server and/or a malware server). The initiating outbound packet(s)'s values, such as IP addresses, domain names, and URIs, may be tested for membership in the data structure TUNNEL-B/F by remote network tunnel gateway. If a membership test returns True, then the remote network tunnel gateway may tunnel the corresponding packet (e.g., through the tunnel gateway) to the associated central network via the tunnel gateway. The tunneled packet may be filtered through the central network's TIG and security stack. Each of the subsequent packets in the tunneled packet's associated communication flow may be tunneled to the central network, and may be filtered through the TIG and security stack. If a membership test returns False, the remote network may bypass the tunnel and instead may forward the packet directly towards the Internet host (and without tunneling the packet to the associated central network.)

Upon receipt of tunneled packets (e.g., from the remote network tunnel gateway) exiting from the tunnel gateway, the central network may forward packets towards the TIG. The TIG may apply the policy to each packet. When the TIG finds the matching packet filtering rule in the policy, the TIG may apply the rule's corresponding action(s)/PTF(s) to the packet. An action/PTF may, for example, drop the packet or may forward the packet to the security stack for additional security processing. An action/PTF may cause a packet to be logged and captured so that the packet and associated communication can be analyzed with a SIEM application and/or a packet analyzer application and/or threat analysis application to determine if the communication is a threat or attack, or if the communication is determined to be benign.

There are many possible variants to the above processes, some of which are detailed below in the Detailed Description section.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the disclosure. In addition, reference is made to particular applications, protocols, and embodiments in which aspects of the disclosure may be practiced. It is to be understood that other applications, protocols, and embodiments may be utilized, and structural and functional modifications may be made, without departing from the scope of the disclosure.

Various connections between elements are discussed in the following description. These connections are general and, unless specified otherwise, may be direct or indirect, wired or wireless, physical or logical (virtual/software-defined). Similarly, the network elements, such as hosts and appliances, may be physical or virtual. In this respect, the specification is not intended to be limiting.

Figure 1:
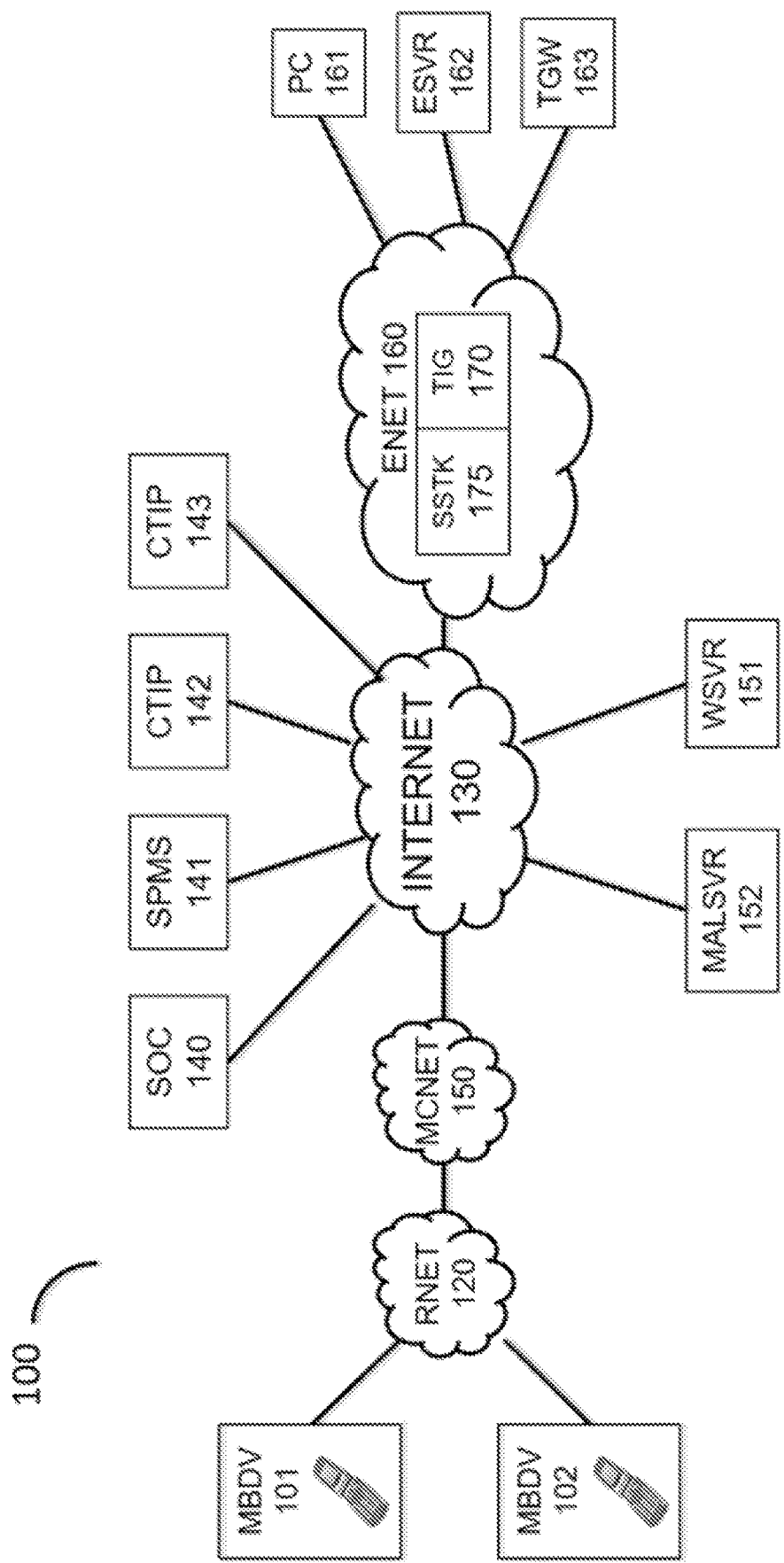
FIG. 1 depicts an illustrative environment for a protection system for mobile devices and associated enterprise networks.

In accordance with embodiments of the disclosure, and referring to FIG. 1, which shows a representative environment 100 of the invention, consider a system for efficient cyber protections of mobile devices and associated enterprise networks. The mobile devices MBDV 101 and MBDV 102 are personally owned/operated by users that may be affiliated with the enterprise that operates the private enterprise network ENET 160. The mobile devices MBDV 101 and MBDV 102 both subscribe to the mobile provider that operates the radio access network RNET 120 and the mobile core network MCNET 150. When the mobile devices MBDV 101 and MBDV 102 make cellular phone calls the signaling and communications are routed through the mobile core network MCNET 150 and may be routed through the mobile core networks of other mobile providers (not shown in FIG. 1). 2G and later-generation mobile devices and mobile networks support access to the Internet and associated TCP/IP networks. The mobile devices MBDV 101 and MBDV 102 may access publicly addressed Internet servers such as web server WSVR 151 and malware server MALSVR 152 via the Internet 130. The mobile device MBDV 101 may download and may install a mobile device security application MBL-CYBER-APP that implements the functions of the packet testing, packet filtering, and packet tunneling described herein. The mobile device security application MBL-CYBER-APP may configure, tunnel client(s), manage TUNNEL-B/F, and perform other functions as described elsewhere in this disclosure specification. The mobile device MBDV 102 has not downloaded the mobile device security application MBL-CYBER-APP and therefore is not protected by the methods and systems of this disclosure.

Private enterprise network ENET 160 may provide Internet access to internal hosts such as PC 161. Private enterprise network ENET 160 may be configured such that traffic between these internal hosts and Internet hosts must pass through threat intelligence gateway TIG 170, which may be enforcing a CTI-derived policy. Traffic may also pass through security stack SSTK 175, which may include at least one of a conventional network firewall and other enterprise network security devices such as a web proxy, SSL proxy, IDS, IPS, and the like. The threat intelligence gateway TIG 170 and security stack SSTK 175 may be located at or near the Internet access point for private enterprise network ENET 160. When applying policy to packets, threat intelligence gateway TIG 170 may produce logs of the packets that match rules in the policy, which may be sent via the Internet to a security operations center SOC 140 for attack analysis by cyber analysts using, for example, SIEM applications and packet analyzer applications.

An enterprise system server ESVR 162 may be a private web application server hosted by the enterprise for use by the enterprise's users, which may include the users that own/operate the mobile devices MBDV 101 and MBDV 102. The mobile devices MBDV 101 and MBDV 102 access the enterprise system server ESVR 162 using an application provided by the enterprise that includes an HTTPS client for accessing the enterprise system server ESVR 162 on port 443 (the port for HTTPS). When an application connects to the enterprise system server ESVR 162, the web application presents a login form. Users may then enter their enterprise credentials to securely access the web application. Network security administrators have opened port 443 of the network firewall in security stack SSTK 175 so that unsolicited inbound HTTPS connections, such as those originating from the applications on the mobile devices MBDV 101 and MBDV 102, can initiate sessions with the enterprise system server ESVR 162.

The host tunnel gateway TGW 163 attached to private enterprise network ENET 160 terminates and concentrates tunnels that may be established with mobile devices such as the mobile device MBDV 101 that have installed the mobile device security application MBL-CYBER-APP. Similar to the enterprise system server ESVR 162, network administrators have opened one or more ports of the network firewall in security stack SSTK 175 so that unsolicited inbound tunnel traffic, such as that originating from the mobile device MBDV 101 and other mobile endpoints that have installed the mobile device security application MBL-CYBER-APP, may access TGW 163. For example, if the tunneling protocol is IPsec tunnel mode, then the administrators may have opened the IPsec well-known ports 500, 50, and 51. TGW 163 may decapsulate and/or may decrypt received packets upon egress from the tunnel. The TGW 163 may forward the decapsulated and/or decrypted packets into the private enterprise network ENET 160. Since these packets will have public Internet addresses in the destination IP address field of their IP headers, the routers and/or switches in private enterprise network ENET 160 may forward these packets towards the Internet access point, and therefore towards the threat intelligence gateway TIG 170, which applies a CTI-derived policy to the packets.

The security policy creation and management server SPMS 141 may collect CTI from one or more CTIPs including, for example, CTIP 142 and 143. The security policy creation and management server SPMS 141 may also aggregate the CTI, may create at least one security policy based on the CTI, and may publish the security policies to subscribers, which may include a plurality of network devices such as host computers and a threat intelligence gateway TIG 170. The security policy creation and management server SPMS 141 may create a data structure TUNNEL-B/F for each security policy and may publish the data structure TUNNEL-B/F to each subscriber associated with each security policy, such as the mobile device security application MBL-CYBER-APP hosted by mobile device MBDV 101. Alternatively, the threat intelligence gateway TIG 170 may create a data structure TUNNEL-B/F for each associated mobile device, such as an associated instance of the mobile device security application MBL-CYBER-APP, that has been associated with threat intelligence gateway TIG 170 for cyber protections, and may publish a current data structure TUNNEL-B/F to the associated mobile device, including each subscribing instance of the mobile device security application MBL-CYBER-APP.

Figure 2:
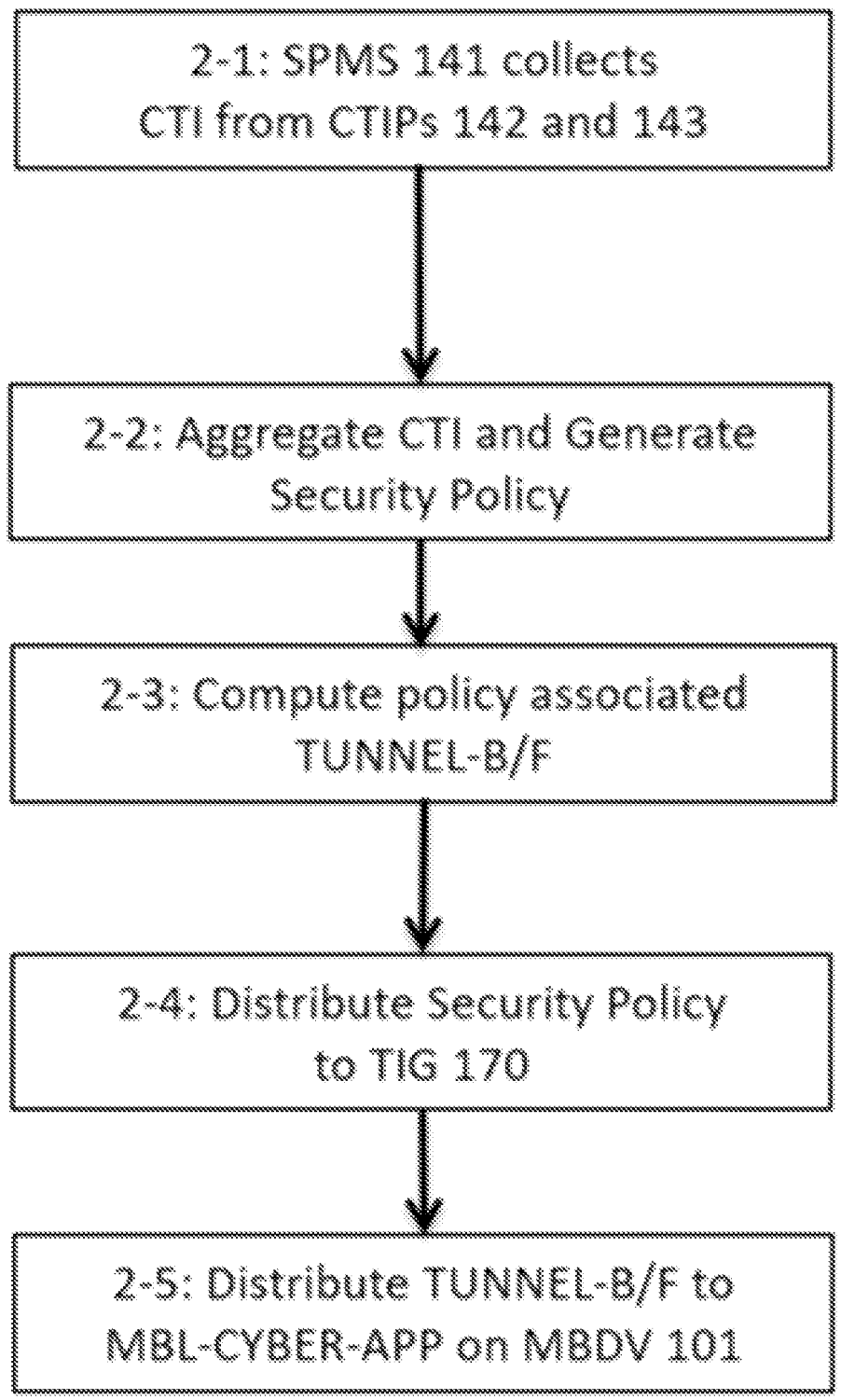
FIG. 2 depicts a flowchart for an operational concept for a security policy creation and management server for configuring mobile devices and associated enterprise network elements.

FIG. 2 depicts a flowchart for an operational concept for a security policy creation and management server for configuring mobile devices and associated enterprise network elements, for a protection system for mobile devices and associated enterprise networks depicted in FIG. 1.

In Step 2-1, the security policy creation and management server SPMS 141 may download the CTI published by threat intelligence providers, such as CTIP 142 and CTIP 143. In Step 2-2, the security policy creation and management server SPMS 141 may aggregate the CTI indicators and may process the CTI to generate a security policy. As multiple threat intelligence providers may provide the same threat indicators, the security policy creation and management server SPMS 141 may merge the rules into a single set, and may remove duplicate threat indicators and otherwise consolidate the threat indicators. The security policy creation and management server SPMS 141 may create at least one packet filtering rule, with each rule including matching criteria corresponding to the threat indicators and corresponding actions/PTF to be applied to a packet when a match is determined. The corresponding actions/PTF may be determined based on multiple factors including requirements provided by the operators/administrators of threat intelligence gateway TIG 170. The security policy creation and management server SPMS 141 may collect each of the generated rules to generate a security policy, and may distribute the security policy to a plurality of security devices, including the threat intelligence gateway TIG 170. In Step 2-3, the security policy creation and management server SPMS 141 may generate a Bloom filter TUNNEL- B/F associated with a security policy by collecting all of the threat indicators, including IP addresses, domain names, URIs, certificate IDs, etc., that characterize each packet filtering rule in a security policy. The security policy creation and management server SPMS 141 may insert the indicators into the data structure TUNNEL-B/F, which may be tested to determine if any rule in the security policy would match the packet elements being tested.

In Step 2-4, the SPMS may publish at least one of the security policy and the data structure TUNNEL-B/F to a plurality of network security devices. The security policy creation and management server SPMS 141 may transmit at least one of the security policy and the data structure TUNNEL-B/F to a plurality of network subscribers, which may include the threat intelligence gateway TIG 170 and a plurality of mobile devices associated with the enterprise network. The threat intelligence gateway TIG 170 may download the security policy and may configure packet filtering logic with the security policy. In Step 2-5, the mobile device security application MBL-CYBER-APP on the mobile device MBDV 101 may download data structure TUNNEL-B/F and may configure tunneling logic with data structure TUNNEL-B/F. If a mobile device MBDV 102 has not installed the mobile device security application, MBL-CYBER-APP it does not download data structure TUNNEL-B/F, and is not protected by security policy. The policy and the data structure TUNNEL-B/F may also be updated, and updates to the security policy and data structure TUNNEL-B/F may be generated and distributed. Based on such updates, the mobile device security application MBL-CYBER-APP may tunnel a packet for filtering that would previously have been allowed to proceed to its intended destination without being tunneled to the enterprise network.

Figure 3:
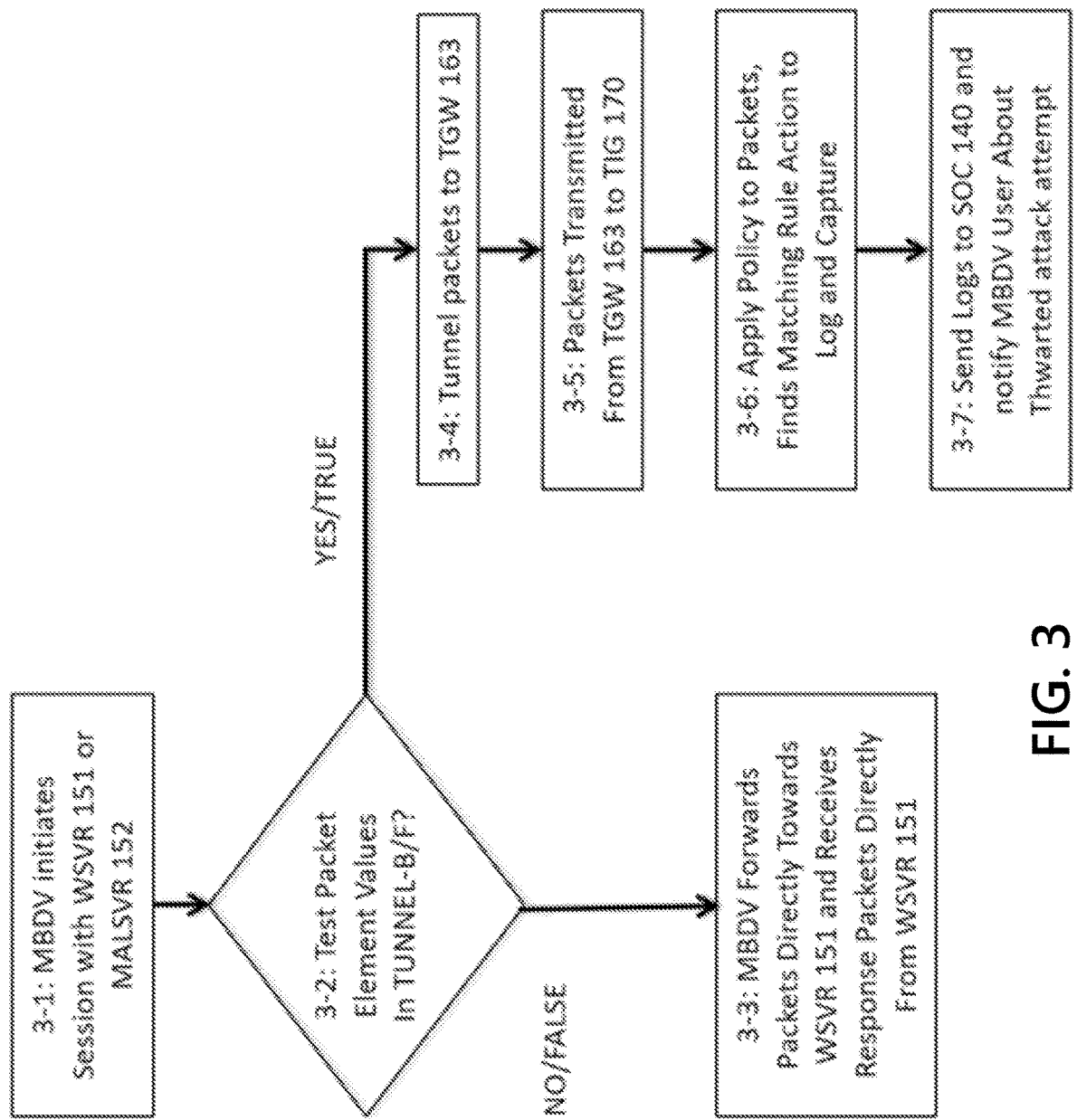
FIG. 3 depicts a flowchart for an operational concept for a packet filtering in mobile devices and associated enterprise networks.

FIG. 3 depicts a flowchart for an operational concept for packet filtering in mobile devices and associated enterprise networks, for a protection system for mobile devices and associated enterprise networks depicted in FIG. 1. The flowchart/operational concept assumes that all devices and hosts have already been configured for operation. In particular, the mobile device MBDV 101 has already downloaded, installed and configured the mobile device security application MBL-CYBER-APP, and may have established a tunnel with TGW 163. Conversely, the mobile device MBDV 102 has not been configured with the mobile device security application MBL-CYBER-APP.

In Step 3-1, a user that may own and/or operate mobile device MBDV, which may be either MBDV 101 or MBDV 102, may check e-mail via an e-mail application and may click on an embedded URL that links to a resource on web server WSVR 151. The mobile device MBDV 101 or 102 may resolve the host name, or fully qualified domain name (FQDN), of the URL's authority to the IP address, for example 12.34.56.78, of web server WSVR 151 by querying the DNS (not shown in FIG. 3). The mobile device MBDV may attempt to initiate a TCP connection with web server WSVR 151 on port 80 (HTTP) by creating a TCP SYN packet with destination port 80, and may encapsulate the TCP packet in an IP packet, which may be set with destination IP address field set to 12.34.56.78 and may be set with source IP address of the corresponding MBDV.

In Step 3-2, before the packet may be forwarded (into the radio access network RNET 120), the mobile device security application MBL-CYBER-APP of MBDV 101 may determine each packet element associated with threat indicators of the data structure TUNNEL-B/F. For example, the mobile device security application MBL-CYBER-APP may extract an IP address (e.g. 12.34.56.78) from the destination IP address field, and may test if 12.34.56.78 is a member of data structure TUNNEL-B/F. The membership test returns FALSE based on a determination that there is no matching packet filtering rule in security policy on threat intelligence gateway TIG 170. The mobile device security application MBL-CYBER-APP may determine that there is no threat risk associated with the tested packet data (e.g. IP address 12.34.56.78 for web server WSVR 151). The mobile device security application MBL-CYBER-APP may determine that there is no need to tunnel the packet to be filtered. The mobile device security application MBL-CYBER-APP might not forward the packet to TGW 163, to the threat intelligence gateway TIG 170, and/or to the security stack SSTK 175.

In Step 3-3, based on a determination that there is no need to tunnel the packet to be filtered, the mobile device MBDV 101 may forward the packet directly towards web server WSVR 151, via the radio access network RNET 120. Similarly, but without executing any tunneling determination/decision logic, MBDV 102 may forward the packet directly towards web server WSVR 151, via the radio access network RNET 120. The packet forwarding may initiate the TCP handshake and subsequently cause establishment of a TCP connection on port 80 of 12.34.56.78. The mobile device MBDV may issue an HTTP GET request method for the URL. Web server WSVR 151 may respond with the requested resource, the web session may be terminated, and the TCP connection may be torn down. During such a communication session, for MBDV 101, the relevant packet field values, such as IP address fields, domain name fields, URI fields, etc., of all inbound and outbound packets may be tested for membership in the data structure TUNNEL-B/F. When each packet in a communication flow is associated with a safe destination, mobile device security application MBL-CYBER-APP may determine that there is no need to tunnel the packet to be filtered as the tests of the data structure TUNNEL-B/F will always returns FALSE, so none of the packets composing the session are tunneled.

In Step 3-1, a user that may own and/or operate mobile device MBDV 101 may read a spear phishing e-mail and may be tricked into clicking on an embedded URL that links to a resource on malware server MALSVR 152, which may contain a web page that spoofs the login page for the enterprise web application on the enterprise system server ESVR 162. The mobile device MBDV 101 may resolve the host name, or fully qualified domain name (FQDN), of the URL's authority to the IP address, for example 87.65.43.21, of malware server MALSVR 152 by querying the DNS (not shown in FIG. 3). The mobile device MBDV 101 may attempt to initiate a TCP connection with malware server MALSVR 152 on port 80 (HTTP) by creating a TCP SYN packet with destination port 80, and may encapsulate the TCP packet in an IP packet with the destination IP address field set to 87.65.43.21. In Step 3-2, before the packet is forwarded by the device MBDV 101 to the radio access network RNET 120, the mobile device security application MBL-CYBER-APP may extract the packet elements (e.g. IP address 87.65.43.21 from the destination IP address field), and may test to determine if any packet element is a member of the data structure TUNNEL-B/F.

The membership test may return a TRUE value or other indication that there is a matching packet filtering rule in the security policy associated with the data structure TUNNEL-B/F. The mobile device security application MBL-CYBER-APP may determine, based on the TRUE value or other indication that there is a matching packet filtering rule in the security policy associated with the data structure TUNNEL- B/F, that the packets need to be filtered by the associated enterprise threat intelligence gateway TIG 170 and that there is some threat risk associated with a packet element (e.g. IP address 87.65.43.21 for malware server MALSVR 152). In Step 3-4, the mobile device MBDV 101, based on the TRUE value or other indication that there is a matching packet filtering rule in the security policy associated with the data structure TUNNEL-B/F, may transmit the packet in a network tunnel to TGW 163. In Step 3-5, the packet may be received at the enterprise network side of the tunnel, may be forwarded through private enterprise network ENET 160 towards the Internet access link, and may be received by the threat intelligence gateway TIG 170 for packet filtering. In Step 3-6, the threat intelligence gateway TIG 170 may apply security policy to the packet, and may determine a rule that matches a packet element (such as IP address 87.65.43.21). The network protective actions/PTFs associated with the determined rule may specify that the packet may be at least one of blocked/dropped, logged, and/or captured.

Alternatively, before transmitting any packet based on a determination of a match from a test of the data structure TUNNEL-B/F, the system may test a secondary data structure, to lower the amount of network traffic. For example, the system may test a block rule data structure, which may represent each rule of the policy that is associated with a block action or PTF. Based on the TRUE value or other indication that there is a matching packet filtering rule in the security policy associated with the block rule data structure, the mobile device security application MBL-CYBER-APP may perform a block rule action to prevent packets associated with a block rule from proceeding to their intended destination, without having to transmit such packets through the tunnel to a packet filtering device in the enterprise network. The block rule data structure may also be a Bloom filter, and the block rule data structure may be a smaller data structure than the data structure TUNNEL-B/F associated with all of the rules of the policy being enforced.

In Step 3-7, the threat intelligence gateway TIG 170 may send the log to a security operations center SOC 140, or other network device. The log may be analyzed by the security operations center SOC 140, such as by cyber analysts using a SIEM application. Based on a determination of a threat risk associated with malware server MALSVR 152 by the CTIP(s) that supplied the CTI for a threat indicator (e.g. IP address 87.65.43.21), the system may take a corrective instructional action. For example, a threat analysis device may report the incident to the user of the mobile device MBDV 101, or may recommend that the user watch a cybersecurity training video that discusses spear phishing e-mail attacks and how to avoid them. Similarly, the mobile device security application MBL-CYBER-APP may generate a log of the threat event and may send the log to a security operations center SOC 140, or other network security application(s) or device(s). The mobile device security application MBL-CYBER-APP may selectively generate logs of the threat event based on an indication that there is a matching packet filtering rule in the security policy associated with the block rule probabilistic data structure.

Figure 4:
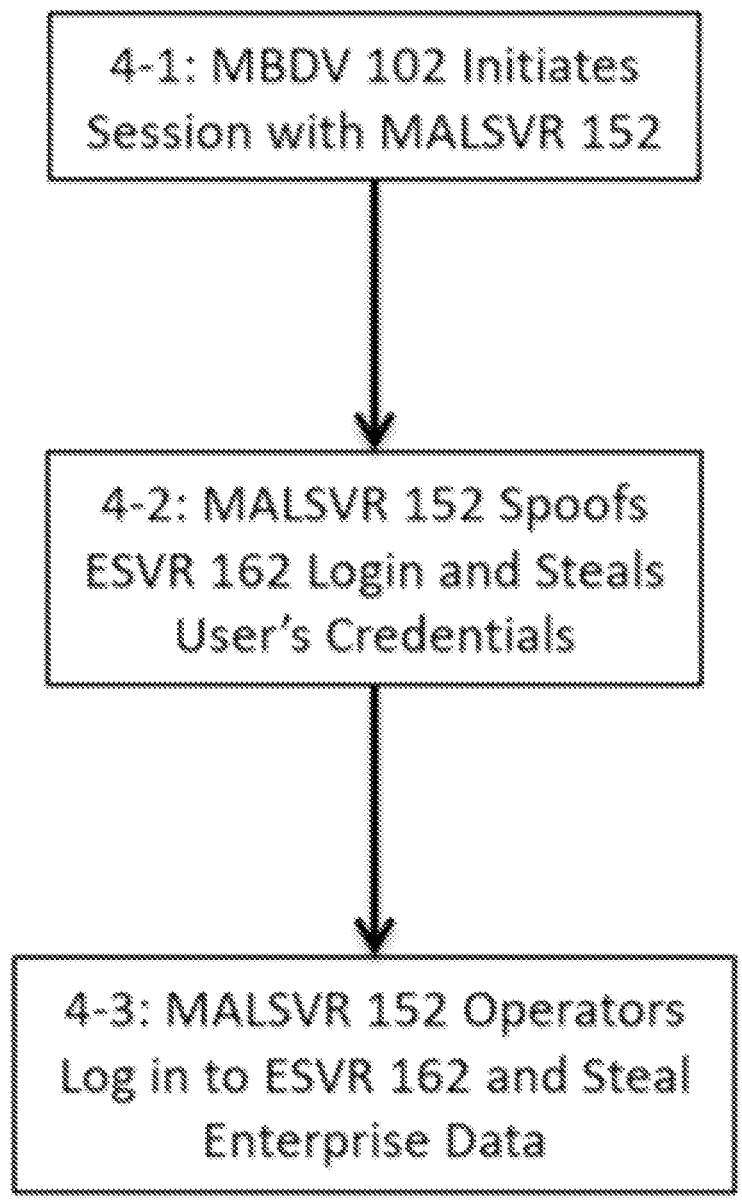
FIG. 4 depicts a flowchart for an operational concept for an unprotected system for mobile devices and associated enterprise networks.

FIG. 4 depicts a flowchart for an operational concept for packet filtering in mobile devices and associated enterprise networks, for a protection system for mobile devices and associated enterprise networks depicted in FIG. 1. The flowchart/operational concept assumes that all devices and hosts have already been configured for operation. In particular, with regards to FIG. 4, the mobile device MBDV has not downloaded, installed or configured the mobile device security application MBL-CYBER-APP.

In Step 4-1, a user that may own or operate mobile device MBDV 102, which is not configured with the mobile device security application MBL-CYBER-APP, may access a spear phishing e-mail as discussed above. However, as mobile device MBDV 102 is not configured with the mobile device security application MBL-CYBER-APP, there is no logic on the mobile device to extract packet elements and test if any packet element is a member of the data structure TUNNEL-B/F. Instead, if a user that may own or operate mobile device MBDV 102 is tricked into clicking on an embedded URL that links to a resource on malware server MALSVR 152, which may be a web page that spoofs the login page for the enterprise web application on the enterprise system server ESVR 162, the mobile device may begin to establish a connection with the malware server MALSVR 152. The mobile device MBDV 102 may resolve the host name, or fully qualified domain name (FQDN), of the URL's authority to the IP address of malware server MALSVR 152 (e.g. IP address 87.65.43.21) by querying the DNS (not shown in FIG. 4). The mobile device MBDV 102 may attempt to initiate a TCP connection with malware server MALSVR 152 on port 80 (HTTP) by creating a TCP SYN packet with destination port 80, and may encapsulate the TCP packet in an IP packet with the determined destination IP address field (e.g. IP address 87.65.43.21). Since there is no mobile device security application MBL-CYBER-APP protecting mobile device MBDV 102, the TCP connection with malware server MALSVR 152 may be established, and mobile device MBDV 102 may issue an HTTP GET request method for the URL.

In Step 4-2, malware server MALSVR 152 responds with the requested resource, which may be a web page/form that spoofs the login page for the enterprise web application on the enterprise system server ESVR 162. The user may enter the login credentials and may post the form to malware server MALSVR 152. When the user enters the login credentials, the MALSVR 152 may log and steal the login credentials. In Step 4-3, a malicious actor that may operate malware server MALSVR 152 may use the stolen credentials to log in to the enterprise system server ESVR 162 and may steal or tamper with the enterprise's sensitive data.

The functions and steps described herein may be embodied in computer-usable data or computer-executable instructions, such as in one or more program modules, executed by one or more computers or other devices to perform one or more functions described herein. Generally, program modules include routines, programs, objects, components, data structures, etc. that perform particular tasks or implement particular abstract data types when executed by one or more processors in a computer or other data-processing device. The computer-executable instructions may be stored on a computer-readable medium such as a hard disk, optical disk, removable storage media, solid-state memory, RAM, etc. As will be appreciated, the functionality of the program modules may be combined or distributed as desired. In addition, the functionality may be embodied in whole or in part in firmware or hardware equivalents, such as integrated circuits, application-specific integrated circuits (ASICs), field-programmable gate arrays (FPGA), and the like. Particular data structures may be used to more effectively implement one or more aspects of the disclosure, and such data structures are contemplated to be within the scope of computer-executable instructions and computer-usable data described herein.

Although not required, one of ordinary skill in the art will appreciate that various aspects described herein may be embodied as a method, system, apparatus, or one or more computer-readable media storing computer-executable instructions. Accordingly, aspects may take the form of an entirely hardware embodiment, an entirely software embodiment, an entirely firmware embodiment, or an embodiment combining software, hardware, and firmware aspects in any combination.

As described herein, the various methods and acts may be operative across one or more computing devices and networks. The functionality may be distributed in any manner or may be located in a single computing device (e.g., a server, client computer, or the like).

Figure 5:
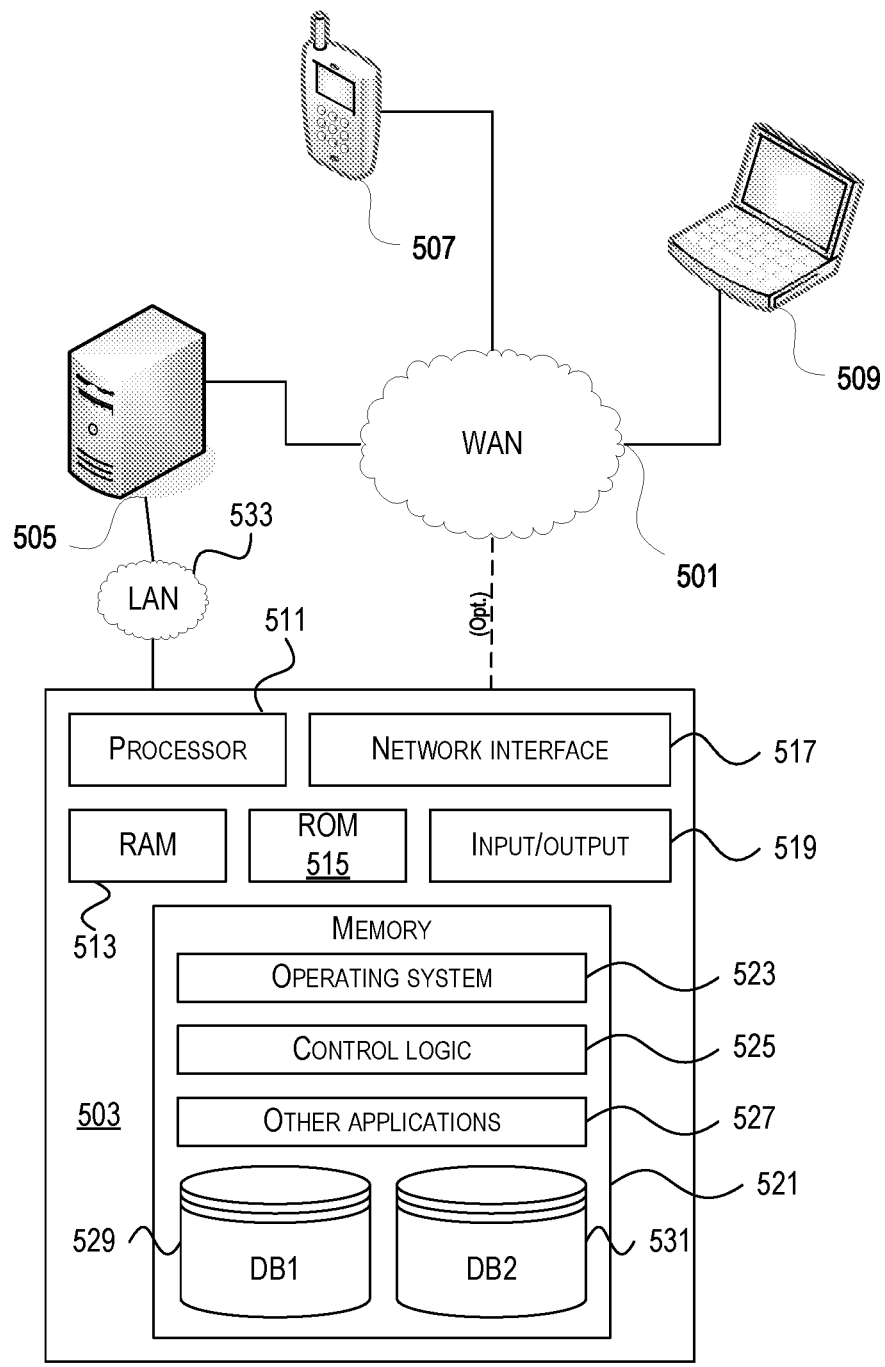
FIG. 5 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 5 illustrates one example of a system architecture and data processing device that may be used to implement one or more illustrative aspects described herein in a standalone and/or networked environment. Various network nodes 503, 505, 507, and 509 may be interconnected via a wide area network (WAN) 501, such as the Internet. Other networks may also or alternatively be used, including private intranets, corporate networks, local area networks (LAN), metropolitan area networks (MAN), wireless networks, personal networks (PAN), software-defined networks (SDN), and the like. Network 501 is for illustration purposes and may be replaced with fewer or additional computer networks. A local area network 533 may have one or more of any known LAN topology and may use one or more of a variety of different protocols, such as Ethernet. Devices 503, 505, 507, and 509 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 503, web server 505, and client computers 507, 509. Data server 503 provides overall access, control and administration of databases and control software for performing one or more illustrative aspects describe herein. Data server 503 may be connected to web server 505 through which users interact with and obtain data as requested. Alternatively, data server 503 may act as a web server itself and be directly connected to the Internet. Data server 503 may be connected to web server 505 through the local area network 533, the wide area network 501 (e.g., the Internet), via direct or indirect connection, or via some other network. Users may interact with the data server 503 using remote computers 507, 509, e.g., using a web browser to connect to the data server 503 via one or more externally exposed web sites hosted by web server 505. Client computers 507, 509 may be used in concert with data server 503 to access data stored therein, or may be used for other purposes. For example, from client device 507 a user may access web server 505 using an Internet browser, as is known in the art, or by executing a software application that communicates with web server 505 and/or data server 503 over a computer network (such as the Internet).

Servers and applications may be combined on the same physical machines, and retain separate virtual or logical addresses, or may reside on separate physical machines. FIG. 5 illustrates just one example of a network architecture that may be used, and those of skill in the art will appreciate that the specific network architecture and data processing devices used may vary, and are secondary to the functionality that they provide, as further described herein. For example, services provided by web server 505 and data server 503 may be combined on a single server.

Each component 503, 505, 507, 509 may be any type of known computer, server, or data processing device. Data server 503, e.g., may include a processor 55 controlling overall operation of the data server 503. Data server 503 may further include random access memory (RAM) 513, read only memory (ROM) 515, network interface 517, input/output interfaces 519 (e.g., keyboard, mouse, display, printer, etc.), and memory 521. Input/output (I/O) 519 may include a variety of interface units and drives for reading, writing, displaying, and/or printing data or files. Memory 521 may further store operating system software 523 for controlling overall operation of the data processing device 503, control logic 525 for instructing data server 503 to perform aspects described herein, and other application software 527 providing secondary, support, and/or other functionality which may or might not be used in conjunction with aspects described herein. The control logic may also be referred to herein as the data server software 525. Functionality of the data server software may refer to operations or decisions made automatically based on rules coded into the control logic, made manually by a user providing input into the system, and/or a combination of automatic processing based on user input (e.g., queries, data updates, etc.).

Memory 521 may also store data used in performance of one or more aspects described herein, including a first database 529 and a second database 531. In some embodiments, the first database may include the second database (e.g., as a separate table, report, etc.). That is, the information can be stored in a single database, or separated into different logical, virtual, or physical databases, depending on system design. Devices 505, 507, and 509 may have similar or different architecture as described with respect to device 503. Those of skill in the art will appreciate that the functionality of data processing device 503 (or device 505, 507, or 509) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 6:
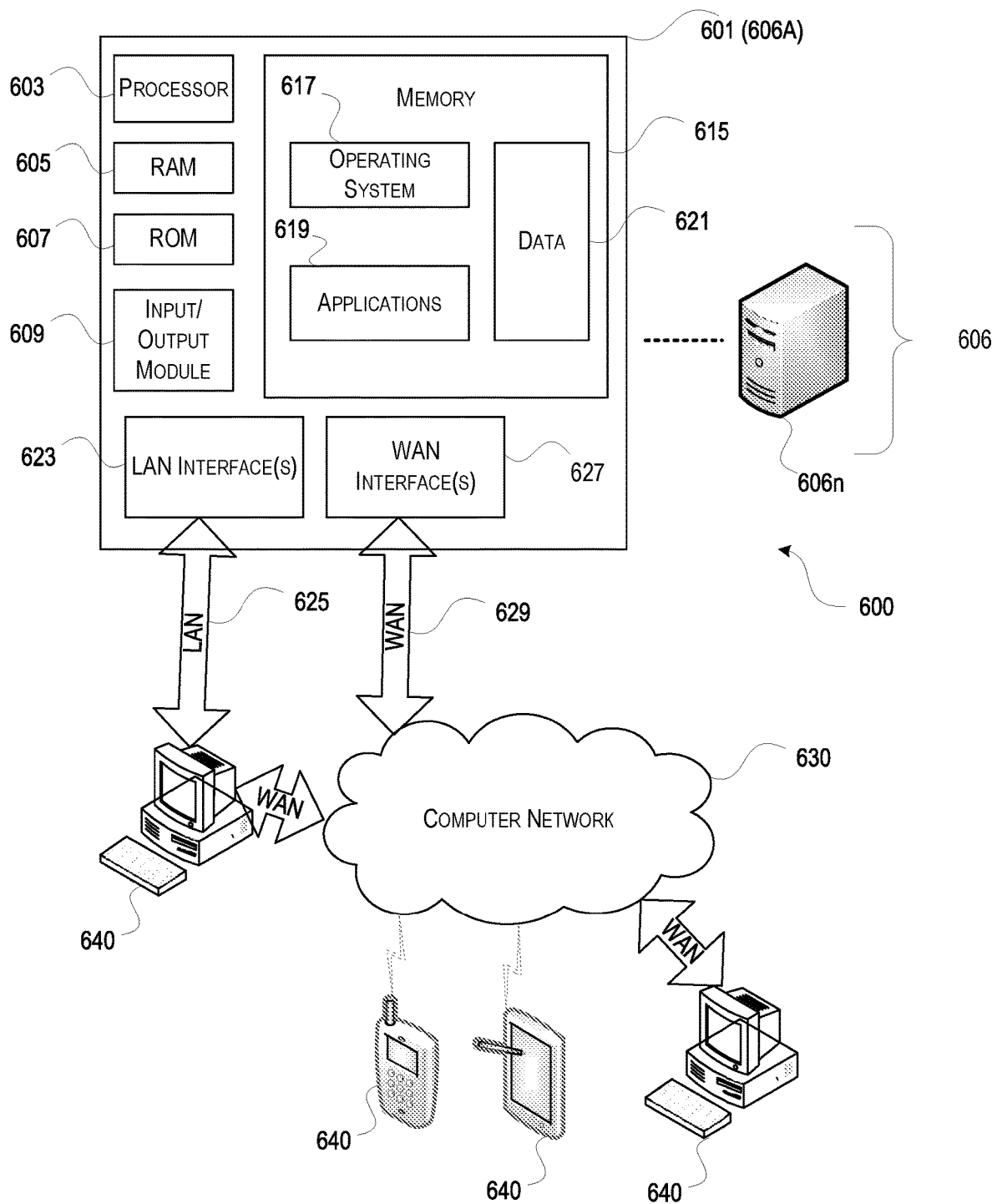
FIG. 6 depicts an illustrative remote-access system architecture that may be used in accordance with one or more illustrative aspects described herein.

With further reference to FIG. 6, one or more aspects described herein may be implemented in a remote-access environment. FIG. 6 depicts an example system architecture including a computing device 501 in an illustrative computing environment 520 that may be used according to one or more illustrative aspects described herein. Computing device 501 may be used as a server 606a in a single-server or multi-server desktop virtualization system (e.g., a remote access or cloud system) configured to provide virtual machines for client access devices. The computing device 501 may have a processor 603 for controlling overall operation of the server and its associated components, including RAM 605, ROM 607, Input/Output (I/O) module 609, and memory 615.

I/O module 609 may include a mouse, keypad, touch screen, scanner, optical reader, and/or stylus (or other input device(s)) through which a user of computing device 101 may provide input, and may also include one or more of a speaker for providing audio output and one or more of a video display device for providing textual, audiovisual, and/or graphical output. Software may be stored within memory 615 and/or other storage to provide instructions to processor 603 for configuring computing device 501 into a special purpose computing device in order to perform various functions as described herein. For example, memory 615 may store software used by the computing device 501, such as an operating system 617, application programs 619, and an associated database 621.

Computing device 501 may operate in a networked environment supporting connections to one or more remote computers, such as terminals 640 (also referred to as client devices). The terminals 640 may be personal computers, mobile devices, laptop computers, tablets, or servers that include many or all of the elements described above with respect to the computing device 503 or 501. The network connections depicted in FIG. 6 include a local area network (LAN) 625 and a wide area network (WAN) 629, but may also include other networks. When used in a LAN networking environment, computing device 501 may be connected to the LAN 625 through a network interface or adapter 623. When used in a WAN networking environment, computing device 501 may include a modem 627 or other wide area network interface for establishing communications over the WAN 629, such as computer network 630 (e.g., the Internet). It will be appreciated that the network connections shown are illustrative and other means of establishing a communications link between the computers may be used. Computing device 501 and/or terminals 640 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 6, one or more client devices 640 may be in communication with one or more servers 606a-606n (generally referred to herein as "server(s) 606"). In one embodiment, the computing environment 520 may include a network appliance installed between the server(s) 606 and client machine(s) 640. The network appliance may manage client/server connections, and in some cases can load balance client connections amongst a plurality of backend servers 606.

The client machine(s) 640 may in some embodiments be referred to as a single client machine 640 or a single group of client machines 640, while server(s) 606 may be referred to as a single server 606 or a single group of servers 606. In one embodiment a single client machine 640 communicates with more than one server 606, while in another embodiment a single server 606 communicates with more than one client machine 640. In yet another embodiment, a single client machine 640 communicates with a single server 606.

A client machine 640 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 606, in some embodiments, may be referenced by any one of the following non-exhaustive terms: server(s), local machine; remote machine; server farm(s), or host computing device(s). In some embodiments, the client machine 640 may be a virtual machine. In some aspects, the virtual machine may be managed by a hypervisor, while in other aspects the virtual machine may be managed by a hypervisor executing on a server 606 or a hypervisor executing on a client 640. The virtual machine may also be a container system managed by a container manager, for example Docker and Linux Containers (LXC). The virtual machine may also be a combination of a hypervisor-managed virtual machine and containers.

Some embodiments may include a client device 640 that displays application output generated by an application remotely executing on a server 606 or other remotely located machine. In these embodiments, the client device 640 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded. The server 606, in some embodiments, may use a remote presentation protocol or other program to send data to a thin-client or remote-display application executing on the client to present display output generated by an application executing on the server 606. The thin-client or remote-display protocol can be a protocol such as the Independent Computing Architecture (ICA) protocol developed by Citrix Systems, Inc. of Ft. Lauderdale, Fla.; or the Remote Desktop Protocol (RDP) developed by the Microsoft Corporation of Redmond, Wash.

A remote computing environment may include more than one server 606a-606n such that the servers 606a-606n are logically grouped together into a server farm 606, for example, in a cloud computing environment. The server farm 606 may include servers 606 that are geographically dispersed while and logically grouped together, or servers 606 that are located proximate to each other while logically grouped together. Geographically dispersed servers 606a-606n within a server farm 606 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 606 may be administered as a single entity, while in other embodiments the server farm 606 can include multiple server farms.

In some embodiments, a server farm may include servers 606 that execute a substantially similar type of operating system platform (e.g., WINDOWS, UNIX, LINUX, iOS, ANDROID, SYMBIAN, etc.) In other embodiments, server farm 606 may include a first group of one or more servers that execute a first type of operating system platform, and a second group of one or more servers that execute a second type of operating system platform.

Server 606 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 606a that receives requests from a client machine 640, forwards the request to a second server 606b (not shown), and responds to the request generated by the client machine 640 with a response from the second server 606b (not shown.) First server 606a may acquire an enumeration of applications available to the client machine 640 and well as address information associated with an application server 606 hosting an application identified within the enumeration of applications. First server 606a can then present a response to the client's request using a web interface, and communicate directly with the client 640 to provide the client 640 with access to an identified application. One or more clients 640 and/or one or more servers 606 may transmit data over network 630, e.g., network 501.

Figure 7:
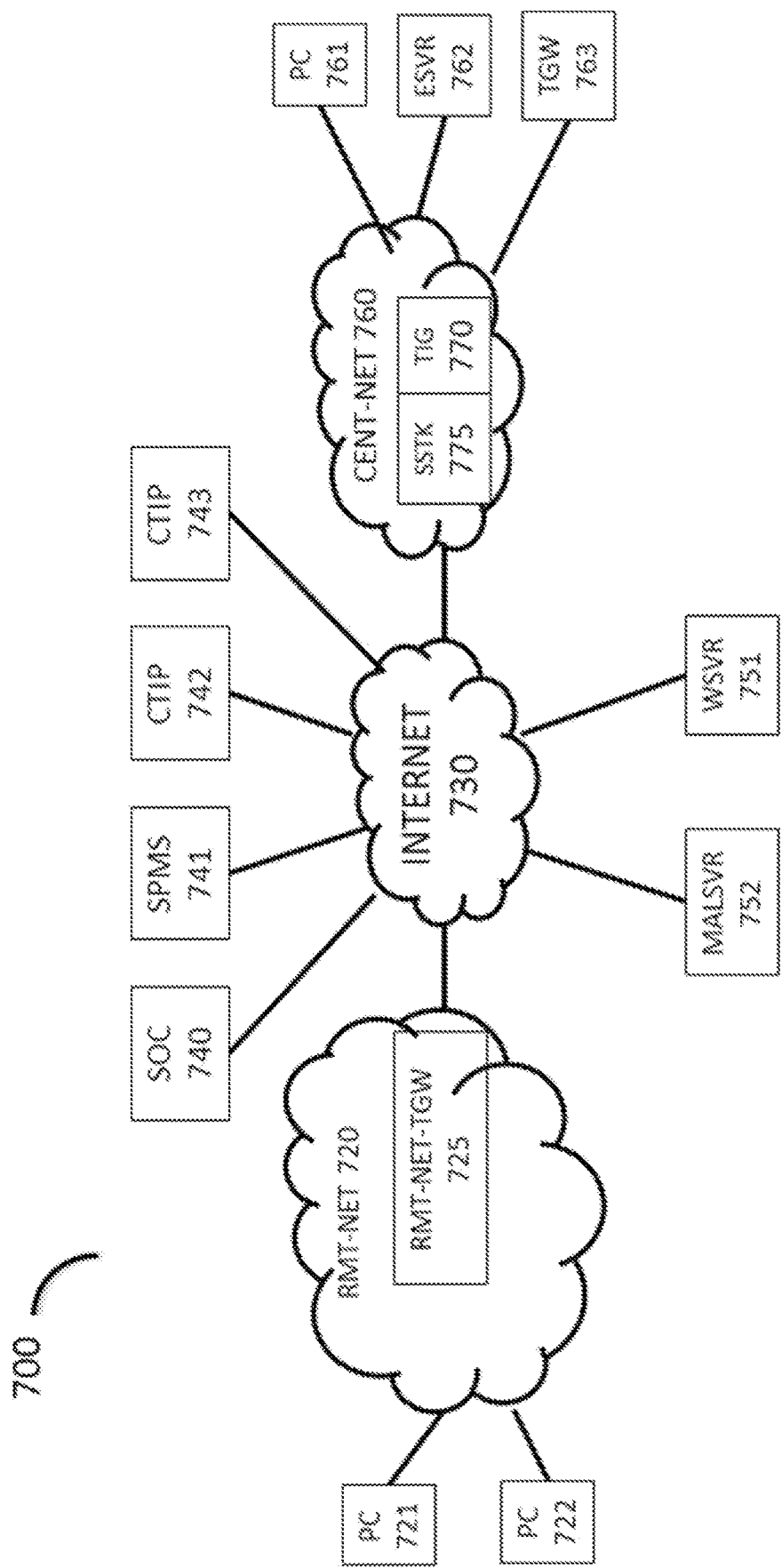
FIG. 7 depicts an illustrative environment for a protection system for remote networks in an enterprise network.

FIG. 7 shows a representative environment 700 that may implement efficient cyber protection of remote network(s) and associated central network(s) that may compose an enterprise network. In at least some arrangements, the remote network(s) and associated central network(s) may be in geographically different locations. Note that, although FIG. 7 depicts an enterprise network composed of a single remote network RMT-NET 720 and a single associated central network CENT-NET 760, the aspects described herein are readily extended to apply to multiple remote networks and one or more associated central networks. FIG. 7 does not limit or restrict the disclosed invention in any way to the case of a single remote network and a single central network.

The (one or more) remote network(s) RMT-NET 720 may be associated with the central network CENT-NET 760 operated by the enterprise. Hosts connected to the remote network RMT-NET 720, such as PC 721 and PC 722 (e.g., desktop personal computers, mobile devices (connecting to, for example, local Wi-Fi access networks), etc.) may directly access publicly addressed Internet servers such as web server WSVR 751 and malware server MALSVR 752 via the Internet 730. When directly accessing the Internet 730, hosts connected to remote network RMT-NET 720, such as PC 721 and PC 722, might not be protected by an enterprise security stack SSTK 775 and threat intelligence gateway TIG 770 associated with the central network CENT-NET 760, and therefore might not be protected from Internet threats (e.g., threats associated with malware server MALSVR 752). For protection, the enterprise may install an in-line remote network tunnel gateway RMT-NET-TGW 725 at or near the network boundary/interface between remote network RMT-NET 720 and the Internet 730. The remote network tunnel gateway RMT-NET-TGW 725 may implement the functions of packet inspection, packet testing, and packet tunneling described herein. The remote network tunnel gateway RMT-NET-TGW 725 may be configured to tunnel selected packets, manage TUNNEL-B/F, and perform other functions as described elsewhere in this disclosure specification. The remote network tunnel gateway RMT-NET-TGW 725 may be integrated or otherwise co-resident with other network boundary devices, such as network firewalls, VPN tunnels, etc.

The central network CENT-NET 760 may provide Internet access to internal hosts (e.g., desktop personal computers, mobile devices (connecting to, e.g., local Wi-Fi access networks), etc.), such as PC 761. The central network CENT-NET 760 may be configured such that traffic between these internal hosts and threat Internet hosts, such as malware server MALSVR 752, must pass through the threat intelligence gateway TIG 770. The threat intelligence gateway TIG 770 may be enforcing a CTI-derived policy. Such traffic may also pass through security stack SSTK 775, which may include at least one of a conventional network firewall and other enterprise network security devices such as a web proxy, SSL/TLS proxy, IDS, IPS, packet capture, and the like. The threat intelligence gateway TIG 770 and the security stack SSTK 775 may be located at or near an Internet access point for the central network CENT-NET 760. When applying policy to packets, threat intelligence gateway TIG 770 may produce logs of the packets that match rules in the policy, which may be sent via the Internet to a security operations center SOC 740 for attack analysis by cyber analysts using, for example, SIEM applications and packet analyzer applications.

An enterprise system server ESVR 762 may be, for example, a private web application server hosted by the enterprise at the central network for use by the enterprise's users, which may include the enterprise users that own/operate the hosts PC 721 and PC 722 connected to the remote network RMT-NET 720. The hosts PC 721 and PC 722 may access the enterprise system server ESVR 762 using, for example, a web browser that includes an HTTPS client for accessing the enterprise system server ESVR 762 on port 443 (the port for HTTPS). When a host connects (via a web browser) to the enterprise system server ESVR 762, the web application may present a login form. Enterprise users may then enter their enterprise credentials to securely access the web application. Network security administrators may open a port (e.g., port 443) of the network firewall in security stack SSTK 775 so that unsolicited inbound HTTPS connections, such as those originating from hosts PC 721 and PC 722, can initiate sessions with the enterprise system server ESVR 762.

The central network tunnel gateway TGW 763 attached to central network CENT-NET 760 may terminate and concentrate tunnels that may be established with associated remote networks (e.g., RMT-NET 720). The associated remote networks may have installed a corresponding tunnel gateway (e.g., RMT-NET-GTW 725) for terminating tunnels connected to the tunnel gateway TGW 763 (via Internet 730). Similar to the enterprise system server ESVR 762, network administrators may open one or more ports of the network firewall in security stack SSTK 775 so that unsolicited inbound tunnel traffic (e.g., originating from RMT-NET-GTW 725), may access TGW 763. For example, if the tunneling protocol is IPsec tunnel mode, then the administrators may have opened the IPsec well-known ports 500, 50, and 51. The tunnel gateway TGW 763 may decapsulate and/or may decrypt received packets upon egress from the tunnel. The tunnel gateway TGW 163 may forward the decapsulated and/or decrypted packets into the (private enterprise) central network CENT-NET 760. Since these packets will have public Internet addresses in the destination IP address field of their IP headers, the routers and/or switches in central network CENT-NET 760 may forward these packets towards the Internet access point, and therefore towards the threat intelligence gateway TIG 770, which applies a CTI-derived policy to the packets.

The security policy creation and management server SPMS 741 may collect CTI from one or more CTIPs including, for example, CTIP 742 and 743. The security policy creation and management server SPMS 741 may also aggregate the CTI (e.g., may remove duplicates), may create at least one security policy based on the CTI, and may publish the security policies to subscribers. The subscribers may include a plurality of network devices such as host computers and the threat intelligence gateway TIG 770. The security policy creation and management server SPMS 741 may create a data structure TUNNEL-B/F for each security policy and may publish the data structure TUNNEL-B/F to each subscriber associated with each security policy, such as the remote network tunnel gateway RMT-NET-TGW 725. Alternatively, the threat intelligence gateway TIG 770 may create a data structure TUNNEL-B/F for each associated remote network tunnel gateway, such as RMT-NET-TGW 725, that has been associated with threat intelligence gateway TIG 770 for cyber protections, and may publish a current data structure TUNNEL-B/F to each associated remote network tunnel gateway.

In one arrangement, the security policy creation and management server SPMS 741 may be external to the central network CENT-NET 760 and the remote network RMT-NET 720, and may communicate with the central network CENT-NET 760 and the remote network RMT-NET 720 via the Internet 730. In another arrangement, the security policy creation and management server SPMS 741 may be attached to the central network CENT-NET 760 or the remote network RMT-NET 720.

One or more elements depicted in FIG. 7 may be the same as, similar to, substantially similar to, or may share one or more hardware, software, and/or firmware components with one or more elements depicted in FIG. 1. For example, the central network CENT-NET 760, with the associated threat intelligence gateway TIG 770 and security stack SSTK 775, may be the same as, similar to, or substantially similar to the enterprise network ENET 160, with the associated threat intelligence gateway 170 and security stack SSTK 175, of FIG. 1. As such, a threat intelligence gateway 170 and the security stack 175 may also enforce CTI-derived policies for tunneled traffic from remote network tunnel gateways (e.g., RMT-NET-TGW 725), in addition to enforcing CTI-derived policies for tunneled traffic from mobile devices (e.g., MBDV 101). Similarly, the internal host PC 161, the enterprise system server 162, the tunnel gateway 163, the security operations center SOC 140, the security policy creation and management server SPMS 141, the CTI providers CTIP 142 and 143, the malware server MALSVR 152, and the web server WSVR 151 as described with respect to FIG. 1 may be the same as, similar to, or substantially similar to the internal host PC 761, the enterprise system server 762, the tunnel gateway 763, the security operations center SOC 740, the security policy creation and management server SPMS 741, the CTI providers CTIP 742 and 743, the malware server MALSVR 752, and the web server WSVR 751. The mobile device 101 (and/or the mobile device security application MBL-CYBER-APP) may be the same as, similar to, substantially similar to, or may share one or more hardware, software, and/or firmware components with remote network tunnel gateway RMT-NET-TGW 725.

Figure 8:
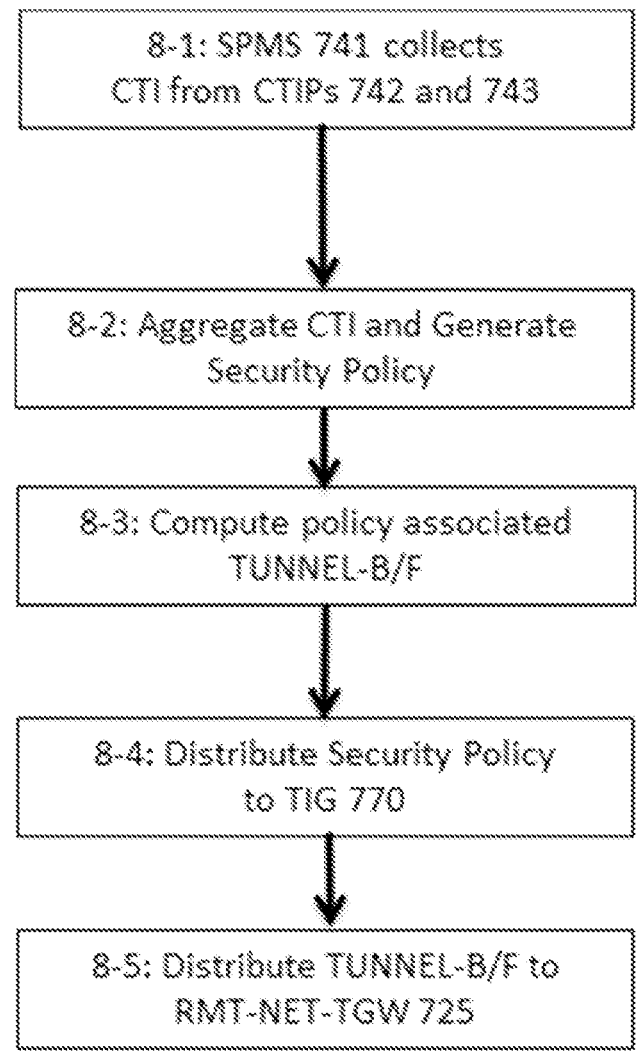
FIG. 8 depicts a flowchart for an operational concept for a security policy creation and management server.

FIG. 8 depicts a flowchart for an operational concept for a security policy creation and management server for configuring remote networks, associated tunnel gateways, and associated central networks elements, for a protection system for an enterprise network composed of remote networks and central networks depicted in FIG. 7.

As an introduction, FIG. 8 depicts one process via which CTI might be collected, generated into a data structure (e.g., a Bloom filter, a Cuckoo filter, a blocked Bloom filter, an xor filter, another probabilistic data structure), and then distributed to remote devices (e.g., RMT-NET-TGW 725). In this manner, the remote devices (e.g., RMT-NET-TGW 725) may use the received data structure to test packets and determine whether those packets should be transmitted to a central device/network for further analysis. For example, if one or more of a packet's attributes are present in/represented by the data structure, then the packet may be forwarded to a central device for further analysis. In contrast, if the one or more attributes are not present in/represented by the data structure, the packet may be forwarded on without further analysis.

In Step 8-1, the security policy creation and management server SPMS 741 may receive (e.g., download) the CTI published by threat intelligence providers, such as CTIP 742 and CTIP 743. This step may be the same as or similar to Step 2-1 of FIG. 2.

In Step 8-2, the security policy creation and management server SPMS 741 may aggregate the CTI indicators and may process the CTI to generate a security policy. As multiple threat intelligence providers may provide the same threat indicators, the security policy creation and management server SPMS 741 may merge the rules into a single set, and may remove duplicate threat indicators and otherwise consolidate the threat indicators. The security policy creation and management server SPMS 741 may create at least one packet filtering rule, with each rule including matching criteria corresponding to the threat indicators and corresponding actions/PTF to be applied to a packet when a match is determined. The corresponding actions/PTF may be determined based on multiple factors including requirements provided by the operators/administrators of threat intelligence gateway TIG 770. The security policy creation and management server SPMS 741 may collect each of the generated rules to generate a security policy, and may distribute the security policy to a plurality of security devices, including the threat intelligence gateway TIG 770. This step may be the same as or similar to Step 2-2 of FIG. 2.

In Step 8-3, the security policy creation and management server SPMS 741 may generate a data structure (e.g., a Bloom filter, a Cuckoo filter, a blocked Bloom filter, an xor filter, another probabilistic data structure) TUNNEL-B/F associated with a security policy by collecting the threat indicators (e.g., by collecting one or more of the IP addresses, IP address ranges, domain names, URIs, certificate IDs, etc.). In this way, the TUNNEL-B/F may characterize each packet filtering rule in a security policy. The security policy creation and management server SPMS 741 may insert the indicators into the data structure TUNNEL-B/F, which may be tested to determine if any rule in the security policy would match the packet elements being tested. In this manner, the TUNNEL-B/F might be used to efficiently test whether a particular packet should be tunneled to a central network (e.g., for further processing, such as further testing based on rules). This step may be the same as or similar to Step 2-3 of FIG. 2.

The security policy creation and management server SPMS 741 may publish at least one of the security policy and the data structure TUNNEL-B/F to a plurality of network security devices. The security policy creation and management server SPMS 741 may transmit at least one of the security policy and the data structure TUNNEL-B/F to the plurality of network security devices. The plurality of network security devices may include the threat intelligence gateway TIG 770 and/or one or more remote network tunnel gateways (e.g., remote network tunnel gateway RMT-NET-TGW 725). For example, as shown in Step 8-4, the security policy creation and management server SPMS 741 may transmit the security policy to the threat intelligence gateway TIG 770 associated with the central network CENT-NET 760. The threat intelligence gateway TIG 770 may download the security policy and may configure packet filtering logic with the security policy. This step may be the same as or similar to Step 2-4 of FIG. 2.

For example, as shown in Step 8-5, security policy creation and management server SPMS 741 may transmit the data structure TUNNEL-B/F to the remote network tunnel gateway RMT-NET-TGW 725. The remote network tunnel gateway RMT-NET-TGW 725 may download data structure TUNNEL-B/F and may configure tunneling logic with data structure TUNNEL-B/F. Based on the security policy and the data structure TUNNEL-B/F, the remote network tunnel gateway RMT-NET-TGW 725 may or might not tunnel a packet to the central network CENT-NET 760 for filtering at the threat intelligence gateway TIG 770 (e.g., as further described with reference to FIG. 9). This step may be the same as or similar to Step 2-5 of FIG. 2.

The security policy and the data structure TUNNEL-B/F may also be updated (e.g., by the security policy creation and management server SPMS 741), and updates to the security policy and data structure TUNNEL-B/F may be generated and distributed (e.g., periodically, based on updates to the CTI provided by CTIPs). Updates to the security policy and data structure TUNNEL-B/F may modify operations of the network security devices (e.g., the threat intelligence gateway TIG 770 and/or one or more remote network tunnel gateways). For example, based on such updates, the remote network tunnel gateway RMT-NET-TGW 725 may tunnel a packet for filtering that would previously have been allowed to proceed (e.g., based on a previous version of the data structure TUNNEL-B/F) to its intended destination without being tunneled to the central network CENT-NET 760.

Additionally and/or alternatively (but not shown in FIG. 8), after receiving the security policy from the security policy creation and management server SPMS 741, the threat intelligence gateway TIG 770 may generate a data structure (e.g., Bloom filter, a Cuckoo filter, another probabilistic data structure) TUNNEL-B/F associated with a security policy by collecting all of the threat indicators, including IP addresses, domain names, URIs, certificate IDs, etc., that characterize each packet filtering rule in the security policy. The threat intelligence gateway TIG 770 may insert the indicators into the data structure TUNNEL-B/F, which may be tested to determine if any rule in the security policy would match the packet elements being tested. Then, the threat intelligence gateway TIG 770 may transmit the TUNNEL-B/F to the remote network tunnel gateways (e.g., RMT-NET-TGW 725) of associated remote networks (e.g., RMT-NET 725).

Remote fixed networks in general (and remote network tunnel gateways in particular) might not have resource limitations (e.g., associated with power supply, memory, processing power, etc.) that may be associated with mobile devices. As such, a remote network tunnel gateway (e.g., RMT-NET-TGW 725) may perform one or more operations as described above in relation to the security policy creation and management server SPMS 741 (e.g., generation of a data structure TUNNEL B/F). For example, the security policy creation and management server SPMS 741 may generate a security policy based on a plurality of CTI indicators and distribute the security policy to the remote network tunnel gateway RMT-NET-TGW 725. The remote network tunnel gateway RMT-NET-TGW 725 may generate the data structure TUNNEL-B/F associated with the security policy. Additionally, because a remote fixed network and associated remote network tunnel gateway may have more relaxed memory constraints compared to mobile devices, then for example the size of a given Bloom filter may be increased, which implies, for example that the false positive rate for the Bloom filter can be decreased and/or that more elements may be included in the Bloom filter.

Figure 9:
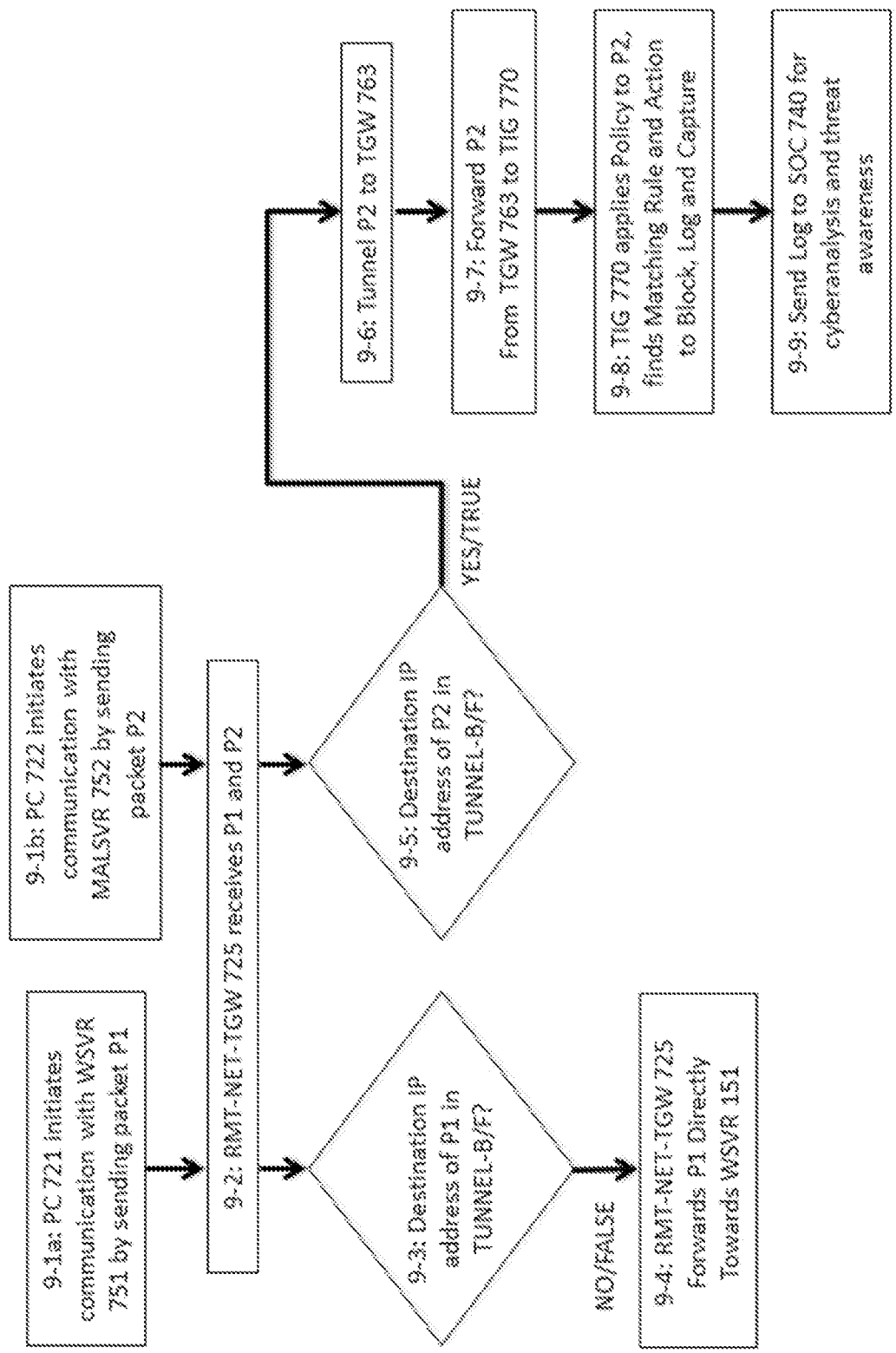
FIG. 9 depicts a flowchart for an operational concept for packet filtering and efficient backhauling for network protection in remote networks.

FIG. 9 depicts a flowchart for an operational concept for packet filtering and efficient backhauling for network protection in remote networks, associated tunnel gateways, and associated central networks. For the case of a remote network (e.g., remote network RMT-NET 720 of FIG. 7, with multiple connected hosts, for example PC 721 and PC 722), a single tunnel may be used to selectively tunnel, or backhaul, to the central network CENT-NET 760, only the packet traffic that is known to be associated with a threat. Otherwise, packets may bypass the tunnel and instead may be forwarded directly to their destinations.

As an introduction, FIG. 9 depicts one process via which remote devices (e.g., RMT-NET-TGW 725) may use a received data structure (e.g., Bloom filter, Cuckoo filter, any other probabilistic data structure) to test packets (e.g., packets associated with Internet communications) and determine whether those packets should be transmitted to a central device/network for further analysis. For example, if one or more of a packet's attributes are present in/represented by the data structure, then the packet may be forwarded to a central device for further analysis. In contrast, if the one or more attributes are not present in/represented by the data structure, the packet may be forwarded (e.g., to a web server) on without further analysis. As described with respect to FIG. 8, the data structure may be generated by the security policy creation and management server SPMS 741.

The received data structure may correspond to a security policy comprising a plurality of packet filtering rules. Each packet filtering rule of the security policy may comprise one or more packet matching criteria and corresponding rule actions (e.g., network protective actions, or PTFs) to take on packets matching the packet matching criteria. At least a first packet filtering rule of the security policy may be automatically generated based on a CTI report provided by an independent CTI provider. At least a second packet filtering rule of the security policy may be automatically generated based on a second CTI report provided by a different independent CTI provider.

With reference to FIG. 7, one or more CTIPs (e.g., CTIP 742 and/or CTIP 743) may have identified malware server MALSVR 752 as a threat but might not have identified web server WSVR 751 as a threat. Accordingly, for example, the IP address (or any other threat indicator) of the malware server MALSVR 752 may be included in CTI that is supplied to the security policy creation and management server SPMS 741. A process similar to that shown and described with reference to FIG. 8 may result in (a) threat intelligence gateway TIG 770 being configured with the security policy that includes a packet filtering rule, where the packet filtering rule may specify a packet matching criterion corresponding to the IP address (or any other threat indicator) of the malware server MALSVR 752; and (b) the remote network tunnel gateway RMT-NET-TGW 725 being configured with a data structure TUNNEL-B/F. The data structure TUNNEL B/F may be generated based on a set of packet matching criteria, which may include the IP address (or any other threat indicator) of the malware server MALSVR 752 as an element in the set. The set of packet matching criteria might not include the IP address (or a threat indicator) of the web server WSVR 751 as an element in the set.

In Step 9-1a, the host PC 721 may initiate communications with the web server WSVR 751. The communication may be initiated with the web server WSVR 751 by the host PC 721, for example, by sending a TCP SYN contained in a packet P1 with a destination IP address corresponding to the web server WSVR 751. A user associated with the host PC 721 may initiate communication with the web server WSVR 751, for example, via a web browser or an application, associated with the web server WSVR 751, as installed on the host PC 721. This step may be the same as or similar to Step 3-1 of FIG. 3.

For example, a user operating the host PC 721 may access a resource on web server WSVR 751 using a URL. The host PC 721 may resolve the host name, or FQDN, of the URL's authority to an IP address (e.g., 12.34.56.78) of the web server WSVR 751 by querying the DNS (not shown in FIG. 7). The host PC 721 may attempt to initiate a TCP connection with the web server WSVR 751 on port 80 (HTTP) by creating a TCP SYN packet with destination port 80, and may encapsulate the TCP SYN packet in an IP packet. The IP packet may comprise a destination IP address field (e.g., set to 12.34.56.78) and a source IP address (e.g., of the host PC 721).

In Step 9-1b, which need not happen at any particular time with respect to step 9-1a, host PC 722 may initiate communications with the malware server MALSVR 752. The communication may be initiated with the malware server MALSVR 752 by the host PC 722, for example, by sending a TCP SYN contained in a packet P2 with a destination IP address corresponding to the malware server MALSVR 752. For example, a malicious application installed on the host PC 722 may initiate clandestine communications with the malware server 752 resulting in the sending of the TCP SYN. In another example, the host PC 722 may initiate the communication with the malware server MALSVR 752 based on a user clicking on a link in a malicious email (e.g., a spear phishing email) or any other form of electronic communication.

For example, a user operating the host PC 722 may read a spear phishing e-mail and may be tricked into clicking on an embedded URL that links to a resource on malware server MALSVR 752. The resource may contain a web page that spoofs the login page for an enterprise web application on the enterprise system server ESVR 762. The host PC 722 may resolve the host name, or an FQDN, of the URL's authority to an IP address (e.g., 87.65.43.21) of malware server MALSVR 752 by querying the DNS (not shown in FIG. 7). The host PC 722 may attempt to initiate a TCP connection with malware server MALSVR 752 on port 80 (HTTP) by creating a TCP SYN packet with destination port 80, and may encapsulate the TCP packet in an IP packet. The IP packet may comprise a destination IP address field set to 87.65.43.21.

In Step 9-2, the remote network tunnel gateway RMT-NET-TGW 725 may receive packets P1 and/or P2. The packets may originate in the remote network RMT-NET 720. At Steps 9-3 and 9-4, the remote network tunnel gateway RMT-NET-TGW 725 may test whether one or more packet elements (e.g., packet matching criteria such as an IP address, domain names, URIs, certificate IDs, or any other packet elements), of the received packets P1 and/or P2, are elements in (e.g., members of/are represented in) the data structure TUNNEL B/F (e.g., as generated at Step 8-3 and distributed at Step 8-5). The data structure TUNNEL B/F may be associated with the security policy enforced by the threat intelligence gateway TIG 770. These steps might be the same as or similar to Step 3-2 of FIG. 3.

In Step 9-3, the remote network tunnel gateway RMT-NET-TGW 725 may determine, for each packet P1 and/or P2, respective packet matching criterion/packet element. The remote network tunnel gateway RMT-NET-TGW 725 may test a policy probabilistic data structure (e.g., the data structure TUNNEL-B/F) for the determined packet matching criterion. The data structure TUNNEL-B/F may represent each of the packet filtering rules of the security policy configured at the threat intelligence gateway TIG 770 (e.g., as described with respect to FIG. 8). Based on a determination that a packet matching criterion/packet element of a packet (e.g., packet P1) is not represented in the data structure TUNNEL-B/F, the remote network tunnel gateway RMT-NET-TGW 725 may forward the packet P1 towards its intended destination (e.g., the web server WSVR 751). Based on a determination that a packet matching criterion/packet element of a packet (e.g., packet P2) is represented in the data structure TUNNEL-B/F, the remote network tunnel gateway RMT-NET-TGW 725 may tunnel the packet P2 to the central network CENT-NET 760. The central network CENT-NET 760 may filter the packet based on the packet filtering rules of the security policy. For example, the threat intelligence gateway TIG 770 at the central network CENT-NET 760 may filter the packet based on the packet filtering rules of the security policy. Further details associated with packet tunneling and filtering are described below.

The remote network tunnel gateway RMT-NET-TGW 725 may extract a packet element of the packet P1. For example, the remote network tunnel gateway RMT-NET-TGW 725 may extract the destination IP address, which may be the IP address of the web server WSVR 751, from the packet P1. The remote network tunnel gateway RMT-NET-TGW 725 may test if the packet element (e.g., the destination IP address) is an element in, or a member of, the data structure TUNNEL-B/F. The membership test may return FALSE, for example, if the packet element is not an element in, or a member of, the data structure TUNNEL-B/F. The membership test returning FALSE may imply that the packet P1 does not correspond to any packet filtering rule in the policy enforced by the threat intelligence gateway TIG 770. Accordingly, in Step 9-4, the remote network tunnel gateway RMT-NET-TGW 725 may forward the packet P1 towards the web server WSVR 751 via the Internet 730 if the membership test returns FALSE.

For example, the remote network tunnel gateway RMT-NET-TGW 725 may extract an IP address (e.g. 12.34.56.78) from the destination IP address field of packet P1, and may test if 12.34.56.78 is a member of the data structure TUNNEL-B/F. The membership test may return FALSE based on IP address 12.34.56.78 not being a member of the data structure TUNNEL-B/F. The remote network tunnel gateway RMT-NET-TGW 725 may determine that there is no matching packet filtering rule, for the packet P1, in the security policy enforced by the threat intelligence gateway TIG 770, for example, based on the membership test returning FALSE. The remote network tunnel gateway RMT-NET-TGW 725 may determine that there is no threat risk associated with the tested packet data (e.g. IP address 12.34.56.78 for web server WSVR 751), for example, based on the membership test returning FALSE. The remote network tunnel gateway RMT-NET-TGW 725 may determine that there is no need to tunnel the packet P1 to be filtered (at the central network CENT-NET 760), for example, based on the membership test returning FALSE. As a result, the remote network tunnel gateway RMT-NET-TGW 725 might not forward the packet P1 to TGW 763, to the threat intelligence gateway TIG 770, and/or to the security stack SSTK 775.

In Step 9-5, the remote network tunnel gateway RMT-NET-TGW 725 may extract a packet element of the packet P2. For example, the remote network tunnel gateway RMT-NET-TGW 725 may extract the destination IP address, which is the IP address of the malware server MALSVR 752, from packet P2. The remote network tunnel gateway RMT-NET-TGW 725 may test if the packet element (e.g., destination IP address) is an element in, or a member of, the data structure TUNNEL-B/F. The membership test may return TRUE, for example, if the packet element is an element in, or a member of, the data structure TUNNEL-B/F. The membership test returning TRUE may imply that the packet P2 corresponds to a packet filtering rule in the policy enforced by the threat intelligence gateway TIG 770. Accordingly, in Step 9-6, the remote network tunnel gateway RMT-NET-TGW 725 may tunnel the packet P2 to the tunnel gateway TGW 763, which may terminate in central network CENT-NET 760.

For example, the remote network tunnel gateway RMT-NET-TGW 725 may extract an IP address (e.g. 87.65.43.21) from the destination IP address field of packet P2, and may test if 87.65.43.21 is a member of the data structure TUNNEL-B/F. The membership test may return a TRUE value based on the IP address 87.65.43.21 being a member of the data structure TUNNEL-B/F. The remote network tunnel gateway RMT-NET-TGW 725 may determine that there may be at least one matching packet filtering rule, for the packet P2, in the security policy enforced by the threat intelligence gateway TIG 770, for example, based on the membership test returning TRUE. The remote network tunnel gateway RMT-NET-TGW 725 may determine that there is some threat risk associated with the tested packet data (e.g. IP address 87.65.43.21 for web server MALSVR 752), for example, based on the membership test returning TRUE. The remote network tunnel gateway RMT-NET-TGW 725 may determine that the packet P2 needs to be tunneled for further processing (e.g., filtering) at the central network CENT-NET 760, for example, based on the membership test returning TRUE. As a result, the remote network tunnel gateway RMT-NET-TGW 725 may forward the packet P2 to the TGW 763, to the threat intelligence gateway TIG 770, and/or to the security stack SSTK 775.

While Steps 9-3 and 9-5 describe the use of a destination IP address of a packet for performing a membership test, any other element (or a plurality of elements) of the packet that may correspond to elements inserted in TUNNEL-B/F may be used.

Additionally and/or alternatively, before transmitting any packet based on a determination of a match from a test of the data structure TUNNEL-B/F, the remote network tunnel gateway RMT-NET-TGW 725 may test a secondary data structure, to lower the amount of network traffic. For example, the remote network tunnel gateway RMT-NET-TGW 725 may test a block rule data structure, which may represent each rule of the security policy that is associated with a block action or PTF. Based on the TRUE value or other indication that there is a matching packet filtering rule in the security policy associated with the block rule data structure, the remote network tunnel gateway RMT-NET-TGW 725 may perform a block rule action to prevent packets associated with a block rule from proceeding to their intended destination, without having to transmit such packets through the tunnel to the tunnel gateway TGW 763. The block rule data structure may also be a Bloom filter, or any other probabilistic data structure.

For example, with reference to the above example where a packet element of the packet P2 is determined to be an element in, or a member of, the data structure TUNNEL-B/F, the remote network tunnel gateway RMT-NET-TGW 725 may extract a second packet element of the packet P2. For example, the second packet element may be a URI associated with the packet P2. The remote network tunnel gateway RMT-NET-TGW 725 may extract the URI of the packet P2, and may test if the URI is a member of a block rule data structure BLOCK-B/F. The membership test may return a TRUE value based on the URI being a member of the data structure BLOCK-B/F. The remote network tunnel gateway RMT-NET-TGW 725 may determine that there is at least one matching packet filtering rule for blocking a packet, for the packet P2, in the security policy enforced by the threat intelligence gateway TIG 770, for example, based on the membership test returning TRUE. The remote network tunnel gateway RMT-NET-TGW 725 may determine that there is high threat risk associated with the tested packet data of packet P2, for example, based on the membership test returning TRUE. The remote network tunnel gateway RMT-NET-TGW 725 may block the packet P2 from exiting the remote network RMT-NET 720 based on the membership test returning TRUE.

Performing membership tests on packets (e.g., testing if packet elements, associated with the packets, are members of the data structure TUNNEL-B/F) at the remote network tunnel gateway RMT-NET-TGW 725 may reduce processing requirements at the hosts (e.g., PC 721 and PC 722). The hosts need not perform the membership tests thereby improving resource availability at the hosts. Further, higher available resources at the remote network tunnel gateway RMT-NET-TGW 725 may enable faster packet processing.

In Step 9-7, the packet P2 may exit/egress from the tunnel and may be forwarded through the central network CENT-NET 760 towards the malware server MALSVR 752 (which corresponds to the destination IP address of P2). On the path towards the malware server MALSVR 752, the packet P2 may be received by the threat intelligence gateway TIG 770.

In Step 9-8, the threat intelligence gateway TIG 770 may apply a security policy to the packet P2. Applying a security policy may comprise applying a packet filtering rule with matching criteria that correspond to the packet element (e.g., destination IP address) of packet P2 (e.g., the IP address of MALSVR 752). The matching rule's disposition (e.g., network protective action, or PTF, or rule action) may be to block the packet, and the directives may be to log and capture the packet. Accordingly, packet P2 may be blocked, logged, and/or captured, thereby protecting PC 722 and the enterprise network from any malware or malicious actions that may result from connecting to the malware server MALSVR 752.

In Step 9-9, the log of packet P2 may be sent to the security operations center SOC 740, where one or more cyber analysis applications and threat awareness applications may process the log. This processing may result in, for example, remedial actions such as sweeping the PC 722 for malware, or any other remedial actions and/or protective actions.

The security policy creation and management server SPMS 741 may generate different security policies for different remote networks associated with the central network. A security policy for a remote network may be based on security requirements associated with the remote network. A remote network with a higher security requirement may be configured with a stricter security policy (e.g., broader packet matching criteria, stricter packet disposition/PTFs). For example, a first security policy of a first remote network with a higher security requirement may result in blocking/dropping of a packet associated with a particular packet element (e.g., IP address), but a second security policy of a second remote network with a lower security requirement may allow transmission of a packet with the same packet element. As such, different data structures TUNNEL B/Fs may be generated, based on the different security policies for the different remote networks, and sent to corresponding remote network tunnel gateways associated with the remote networks. With reference to the above example, the packet element may be a member of a first TUNNEL B/F for the first remote network, and might not be a member of a second TUNNEL B/F for the second remote network.

As one example of the above concept, an enterprise organization may have a finance department and a marketing department, and both might be located in remote offices. The finance department might have a higher security requirement than the marketing department, in part because the former might have access to sensitive banking information, whereas the latter might need the ability to freely access online content relating to potential clients. In such a circumstance, a CTI-derived policy (e.g., as embodied in a Bloom filter) for the remote network corresponding to the finance department might have more rules and/or be otherwise stricter as compared to a CTI-derived policy for the remote network corresponding to the marketing department.

As another example, the different remote networks may be located in different geographical locations. The security policy creation and management server SPMS 741 may generate corresponding security policies for the remote networks based on the most relevant threats associated with respective geographical locations. For example, a country A corresponding to a first remote network may be more susceptible to a first set of threats characterized by a first set of CTI indicators. Country B corresponding to a second remote network may be more susceptible to a second set of threats characterized by a second set of CTI indicators. The security policy creation and management server SPMS 741 may generate a first security policy based on the first set of CTI indicators for the first remote network, and may generate a second security policy based on the second set of CTI indicators for the second remote network.

The security policy creation and management server SPMS 741 may generate different security policies for different subsets of hosts within a same remote network. A security policy for a subset of hosts within a remote network may be based on security requirements associated with the subset of hosts. A subset of hosts within a remote network with a higher security requirement may be configured with a stricter security policy (e.g., broader packet matching criteria, stricter packet disposition/PTFs) than other hosts within the same remote network. For example, a first security policy of a first subset of hosts, within a remote network, with a higher security requirement may result in blocking/dropping of a packet associated with a particular packet element (e.g., IP address), but a second security policy of a second subset of hosts, within the remote network, with a lower security requirement may allow transmission of a packet with the same packet element. Different data structures TUNNEL B/Fs may be generated, based on the different security policies for the different subsets of host devices, and sent to a remote network tunnel gateway associated with the remote network. With reference to the above example, the packet element may be a member of a first TUNNEL B/F for the first subset of hosts, and might not be a member of a second TUNNEL B/F for the second subset of hosts. The remote network tunnel gateway may perform (e.g., at Step 9-3 or Step 9-4) a membership test on a packet, received from a host, using a data structure TUNNEL B/F corresponding to the subset to which the host belongs.

As one example of the above concept, an enterprise organization may have a finance department and a marketing department, and both might be located in a same remote office and share the same remote network. In such a circumstance, a CTI-derived policy (e.g., as embodied in a Bloom filter) for host devices corresponding to the finance department might have more rules and/or be otherwise stricter as compared to a CTI-derived policy for host devices corresponding to the marketing department.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order and that one or more illustrated steps may be optional. Any and all features in the following claims may be combined or rearranged in any way possible.

What is claimed is:

1. A method for selectively filtering traffic of a remote network by tunneling portions of that traffic to a central network to be filtered by the central network, the method comprising:
receiving, by a remote network tunnel gateway and from a security policy management server external to the remote network and external to the central network, a policy probabilistic data structure that represents each of a plurality of packet filtering rules of a security policy, wherein the plurality of packet filtering rules were generated, by the security policy management server, based on information received from a plurality of different independent cyber threat intelligence providers;
receiving, by the remote network tunnel gateway, a plurality of packets traversing a boundary of the remote network;
based on a determination that a first packet matching criterion of a first packet of the plurality of packets is not represented in the policy probabilistic data structure, forwarding, by the remote network tunnel gateway, the first packet towards its intended destination without tunneling the first packet to the central network; and
based on a determination that a second packet matching criterion of a second packet of the plurality of packets is represented in the policy probabilistic data structure, tunneling, by the remote network tunnel gateway, the second packet to the central network, wherein the central network is configured to filter the second packet based on the plurality of packet filtering rules of the security policy.

2. The method of claim 1, further comprising:
sending the policy probabilistic data structure to a second remote network tunnel gateway, wherein the second remote network tunnel gateway is configured to selectively tunnel packets to the central network based on the policy probabilistic data structure.

3. The method of claim 1, further comprising:
receiving a new policy probabilistic data structure based on an update to the plurality of packet filtering rules of the security policy; and
based on a determination that a third packet matching criterion of a third packet of the plurality of packets is represented in the new policy probabilistic data structure, tunneling, by the remote network tunnel gateway, the third packet to the central network, wherein, prior to generating the new policy probabilistic data structure, the policy probabilistic data structure was configured to cause the remote network tunnel gateway to transmit packets having the third packet matching criterion to their respective destinations without tunneling the packets to the central network.

4. The method of claim 1, wherein each packet filtering rule of the security policy comprises one or more packet matching criteria and corresponding rule actions to take on packets matching the packet matching criteria.

5. The method of claim 1, wherein the first packet and the second packet originate in the remote network or are received by the remote network.

6. The method of claim 1, further comprising:
receiving a second policy probabilistic data structure that represents each of a second plurality of packet filtering rules of a second security policy different from the security policy; and
based on a determination that a third packet matching criterion of a third packet of the plurality of packets is represented in the second policy probabilistic data structure, tunneling the third packet to the central network.

7. The method of claim 1, wherein the policy probabilistic data structure is one of:
a Bloom filter;
a blocked Bloom filter;
a Cuckoo filter; or
an xor filter.

8. The method of claim 1, wherein the central network is configured to filter the second packet by performing a rule action, corresponding to the second packet matching criterion, on the second packet.

9. The method of claim 1, further comprising:
based on a determination that a third packet matching criterion of a third packet of the plurality of packets is represented in a block rule probabilistic data structure, preventing the third packet from proceeding to its intended destination.

10. A remote network tunnel gateway configured to selectively filter traffic of a remote network by tunneling portions of that traffic to a central network to be filtered by the central network, the remote network tunnel gateway comprising:
one or more processors; and
memory storing instructions that, when executed by the one or more processors, cause the remote network tunnel gateway to:
receive, from a security policy management server external to the remote network and external to the central network, a policy probabilistic data structure that represents each of a plurality of packet filtering rules of a security policy, wherein the plurality of packet filtering rules were generated, by the security policy management server, based on information received from a plurality of different independent cyber threat intelligence providers;
receive a plurality of packets traversing a boundary of the remote network;
based on a determination that a first packet matching criterion of a first packet of the plurality of packets is not represented in the policy probabilistic data structure, forward the first packet towards its intended destination without tunneling the first packet to the central network; and
based on a determination that a second packet matching criterion of a second packet of the plurality of packets is represented in the policy probabilistic data structure, tunnel the second packet to the central network, wherein the central network is configured to filter the second packet based on the plurality of packet filtering rules of the security policy.

11. The remote network tunnel gateway of claim 10, wherein the instructions, when executed by the one or more processors, cause the remote network tunnel gateway to:
send the policy probabilistic data structure to a second remote network tunnel gateway, wherein the second remote network tunnel gateway is configured to selectively tunnel packets to the central network based on the policy probabilistic data structure.

12. The remote network tunnel gateway of claim 10, wherein the instructions, when executed by the one or more processors, cause the remote network tunnel gateway to:
receive a new policy probabilistic data structure based on an update to the plurality of packet filtering rules of the security policy; and based on a determination that a third packet matching criterion of a third packet of the plurality of packets is represented in the new policy probabilistic data structure, tunnel the third packet to the central network, wherein, prior to generating the new policy probabilistic data structure, the policy probabilistic data structure was configured to cause the remote network tunnel gateway to transmit packets having the third packet matching criterion to their respective destinations without tunneling the packets to the central network.

13. The remote network tunnel gateway of claim 10, wherein each packet filtering rule of the security policy comprises one or more packet matching criteria and corresponding rule actions to take on packets matching the packet matching criteria.

14. The remote network tunnel gateway of claim 10, wherein the first packet and the second packet originate in the remote network or are received by the remote network.

15. The remote network tunnel gateway of claim 10, wherein the instructions, when executed by the one or more processors, cause the remote network tunnel gateway to:
receive a second policy probabilistic data structure that represents each of a second plurality of packet filtering rules of a second security policy different from the security policy; and
based on a determination that a third packet matching criterion of a third packet of the plurality of packets is represented in the second policy probabilistic data structure, tunnel the third packet to the central network.

16. The remote network tunnel gateway of claim 10, wherein the policy probabilistic data structure is one of:
a Bloom filter;
a blocked Bloom filter;
a Cuckoo filter; or
an xor filter.

17. The remote network tunnel gateway of claim 10, wherein the central network is configured to filter the second packet by performing a rule action, corresponding to the second packet matching criterion, on the second packet.

18. The remote network tunnel gateway of claim 10, wherein the instructions, when executed by the one or more processors, cause the remote network tunnel gateway to:
based on a determination that a third packet matching criterion of a third packet of the plurality of packets is represented in a block rule probabilistic data structure, prevent the third packet from proceeding to its intended destination.

19. One or more non-transitory computer-readable media storing instructions that, when executed, cause a remote network tunnel gateway to selectively filter traffic of a remote network by tunneling portions of that traffic to a central network to be filtered by the central network by causing the remote network tunnel gateway to:
receive, from a security policy management server external to the remote network and external to the central network, a policy probabilistic data structure that represents each of a plurality of packet filtering rules of a security policy, wherein the plurality of packet filtering rules were generated, by the security policy management server, based on information received from a plurality of different independent cyber threat intelligence providers;
receive a plurality of packets traversing a boundary of the remote network;
based on a determination that a first packet matching criterion of a first packet of the plurality of packets is not represented in the policy probabilistic data structure, forward the first packet towards its intended destination without tunneling the first packet to the central network; and
based on a determination that a second packet matching criterion of a second packet of the plurality of packets is represented in the policy probabilistic data structure, tunnel the second packet to the central network, wherein the central network is configured to filter the second packet based on the plurality of packet filtering rules of the security policy.

20. The one or more non-transitory computer-readable media of claim 19, wherein the instructions, when executed, cause the remote network tunnel gateway to:
send the policy probabilistic data structure to a second remote network tunnel gateway, wherein the second remote network tunnel gateway is configured to selectively tunnel packets to the central network based on the policy probabilistic data structure.

21. The one or more non-transitory computer-readable media of claim 19, wherein the instructions, when executed, cause the remote network tunnel gateway to:
receive a new policy probabilistic data structure based on an update to the plurality of packet filtering rules of the security policy; and
based on a determination that a third packet matching criterion of a third packet of the plurality of packets is represented in the new policy probabilistic data structure, tunnel the third packet to the central network, wherein, prior to generating the new policy probabilistic data structure, the policy probabilistic data structure was configured to cause the remote network tunnel gateway to transmit packets having the third packet matching criterion to their respective destinations without tunneling the packets to the central network.

22. The one or more non-transitory computer-readable media of claim 19, wherein each packet filtering rule of the security policy comprises one or more packet matching criteria and corresponding rule actions to take on packets matching the packet matching criteria.

23. The one or more non-transitory computer-readable media of claim 19, wherein the first packet and the second packet originate in the remote network or are received by the remote network.

24. The one or more non-transitory computer-readable media of claim 19, wherein the instructions, when executed, cause the remote network tunnel gateway to:
receive a second policy probabilistic data structure that represents each of a second plurality of packet filtering rules of a second security policy different from the security policy; and
based on a determination that a third packet matching criterion of a third packet of the plurality of packets is represented in the second policy probabilistic data structure, tunnel the third packet to the central network.

25. The one or more non-transitory computer-readable media of claim 19, wherein the policy probabilistic data structure is one of:
a Bloom filter;
a blocked Bloom filter;
a Cuckoo filter; or
an xor filter.

26. The one or more non-transitory computer-readable media of claim 19, wherein the central network is configured to filter the second packet by performing a rule action, corresponding to the second packet matching criterion, on the second packet.

27. The one or more non-transitory computer-readable media of claim 19, wherein the instructions, when executed, cause the remote network tunnel gateway to:
 based on a determination that a third packet matching criterion of a third packet of the plurality of packets is represented in a block rule probabilistic data structure, prevent the third packet from proceeding to its intended destination.

\* \* \* \* \*